United States Patent
Ijuin et al.

(10) Patent No.: US 10,693,111 B2
(45) Date of Patent: Jun. 23, 2020

(54) OUTER PACKAGING MATERIAL FOR ELECTRIC STORAGE DEVICE AND ELECTRIC STORAGE DEVICE USING THE SAME

(71) Applicant: TOPPAN PRINTING CO., LTD., Tokyo (JP)

(72) Inventors: Wataru Ijuin, Tokyo (JP); Satoshi Sasaki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/690,576

(22) Filed: Aug. 30, 2017

(65) Prior Publication Data

US 2017/0365825 A1  Dec. 21, 2017

Related U.S. Application Data

(63) Continuation of application No. PCT/JP2016/056393, filed on Mar. 2, 2016.

(30) Foreign Application Priority Data

Mar. 3, 2015  (JP) ................................. 2015-041271
Mar. 3, 2015  (JP) ................................. 2015-041274

(51) Int. Cl.
*H01M 2/08* (2006.01)
*H01M 2/02* (2006.01)
(Continued)

(52) U.S. Cl.
CPC .......... *H01M 2/0287* (2013.01); *H01G 11/78* (2013.01); *H01G 11/82* (2013.01);
(Continued)

(58) Field of Classification Search
CPC .... H01M 2/02; H01M 2/0202; H01M 2/0275; H01M 2/0285; H01M 2/0287; H01M 2/08; H01M 2220/30
See application file for complete search history.

(56) References Cited

U.S. PATENT DOCUMENTS

| 2003/0180609 A1* | 9/2003 | Yamashita | ............ H01M 2/021 429/185 |
| 2010/0189998 A1* | 7/2010 | MacKerron | ............ B29C 71/02 428/336 |

(Continued)

FOREIGN PATENT DOCUMENTS

| JP | 2006-331897 | 12/2006 |
| JP | 2013-006412 | 1/2013 |

(Continued)

OTHER PUBLICATIONS

Machine translation for KR 20020052481 A. (Year: 2018).*

(Continued)

*Primary Examiner* — Raymond Alejandro
(74) *Attorney, Agent, or Firm* — Foley & Lardner LLP

(57) ABSTRACT

An outer packaging material for electric storage device comprises at least a substrate layer, an adhesion layer, a metal foil layer, a sealant adhesion layer, and a sealant layer laminated in this order, wherein the substrate layer is one made of either a polyamide film having a hot water shrinkage rate at 95° C. of less than 5% and a hot shrinkage rate at 180° C. of 4 to 16%, or a polyester film having a hot water shrinkage rate at 95° C. of less than 5% and a hot shrinkage rate at 180° C. of 10 to 25%.

20 Claims, 4 Drawing Sheets

(51) Int. Cl.
*H01G 11/78* (2013.01)
*H01G 11/84* (2013.01)
*H01G 11/82* (2013.01)
*H01M 10/0525* (2010.01)

(52) U.S. Cl.
CPC .............. *H01G 11/84* (2013.01); *H01M 2/02* (2013.01); *H01M 2/0202* (2013.01); *H01M 2/0285* (2013.01); *H01M 2/08* (2013.01); *H01M 10/0525* (2013.01); *H01M 2220/30* (2013.01); *Y02E 60/13* (2013.01)

(56) References Cited

U.S. PATENT DOCUMENTS

| | | |
|---|---|---|
| 2013/0149597 A1 | 6/2013 | Suzuta et al. |
| 2013/0209868 A1* | 8/2013 | Suzuta ................ H01M 2/0275 429/176 |
| 2014/0234698 A1 | 8/2014 | Taniguchi |
| 2015/0030910 A1* | 1/2015 | Minamibori ........ H01M 2/1094 429/163 |

FOREIGN PATENT DOCUMENTS

| | | | |
|---|---|---|---|
| JP | 2013-101763 A | | 5/2013 |
| JP | 2013-101765 | | 5/2013 |
| JP | 2014-069384 | | 4/2014 |
| KR | 20020052481 A | * | 7/2002 |
| WO | WO-2014/017457 | | 1/2014 |

OTHER PUBLICATIONS

International Search Report Issued in International Patent Application No. PCT/JP2016/056393 dated Jun. 7, 2016.
Extended European Search Report dated Oct. 22, 2018 in corresponding application No. 16758949.8.
Japanese Office Action dated Aug. 29, 2019 for corresponding Application No. 2015-041274 (5 pages).

* cited by examiner

OUTER PACKAGING MATERIAL FOR ELECTRIC STORAGE DEVICE AND ELECTRIC STORAGE DEVICE USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/056393, filed on Mar. 2, 2016, which is based upon and claims the benefit of priority of Japanese Patent Application No. 2015-041271, filed on Mar. 3, 2015, and Japanese Patent Application No. 2015-041274, filed on Mar. 3, 2015, the entireties of which are hereby incorporated by reference.

TECHNICAL FIELD

The present invention relates to an outer packaging material for electric storage device and also to an electric storage device using the same.

BACKGROUND

Known electric storage devices include, for example, lithium-ion batteries, nickel-hydrogen batteries and secondary batteries such as lead storage batteries, and electrochemical capacitors such as electric double-layer capacitors. The miniaturization of mobile devices or the limitation on setup space now requires further downsizing of electric storage devices, and attention has been paid to lithium-ion batteries whose energy density is high. As to the outer packaging materials used for lithium-ion batteries, although metal cans have been hitherto used, there are increasing uses of multilayer films that are light in weight and high in heat dissipation and can be made at low costs.

With the lithium-ion batteries using such a multilayer as mentioned above, such a configuration is adopted that battery contents (positive electrode, separator, negative electrode, electrolytic solution and the like) are covered with an outer packaging material including an aluminum foil layer in order to prevent the infiltration of moisture thereinside. The lithium-ion battery adopting such a configuration is called an aluminum-laminated type lithium-ion battery.

A known aluminum-laminated type of lithium-ion battery is, for example, an embossed type of lithium-ion battery wherein a recessed portion is formed at part of an outer packaging material by cold forming, battery contents are accommodated in the recessed portion, and the residual portions of the outer packaging material are folded back, followed by heat sealing the edge portions (e.g., see Patent Literature 1). With such a lithium-ion battery, a deeper recessed portion formed by cold forming enables the accommodation of a greater number of battery contents therein. Thus, a higher energy density can be realized.

CITATION LIST

Patent Literature

PTL 1: JP 2013-101765 A

SUMMARY OF THE INVENTION

Technical Problem

However, when an existing outer packaging material for electric storage device is subjected to deep drawing for forming a deep recessed portion, breakage between an adhesive layer and a metal foil layer may be caused in some cases. To avoid this, it is required that an outer packaging material be improved in deep drawing formability.

In the step of fabricating an outer packaging material, there may be some cases that require the lamination step of laminating a plurality of layers and the step of drying the adhesives used for interlayer adhesion. In this connection, however, a substrate layer may undergo thermal shrinkage by application of heat during the lamination or drying thereby lowering the adhesion between the substrate layer and the metal foil layer. The lowering by heat of the adhesion between the substrate layer and the metal foil layer is likely to occur not only in a high temperature environment during lamination or drying, but also in hot water or in a high temperature and high humidity environment.

Further, in the manufacturing process of batteries, there may be some cases that an electrolytic solution in the battery is leaked to outside. On this occasion, the leaked electrolytic solution may become adhered to surrounding batteries, or surrounding batteries may be exposed to an atmosphere of the electrolytic solution due to the leaked electrolytic solution. Thus, the metal foil layer may be corroded. In the case where an outer packaging material is exposed to an electrolytic solution in a manner as set out above, there is some concern that the adhesion between the substrate layer and the metal foil layer becomes lower.

If such an outer packaging material is stored over a long period of time, peeling between the substrate layer and the metal foil layer may occur due to the lowering in adhesion between the substrate layer and the metal foil as described above. Therefore, excellent adhesion has been demanded in order to enable the peeling between the substrate layer and the metal foil layer to be suppressed from occurring over a long time even if the outer packaging material is exposed to heat (high temperature, hot water and high temperature and high humidity) and/or to an electrolytic solution.

The present invention has been made under such circumstances as stated above and has for its object the provision of an outer packaging material for electric storage device, which is able to maintain the adhesion between a substrate layer and a metal foil layer in the course of the fabrication of the battery and in use while improving deep drawing formability, and also to an electric storage device using the same.

Solution to Problem

In order to achieve the above object, the invention contemplates to provide an outer packaging material for electric storage device, which has a structure including at least a substrate layer, an adhesion layer, a metal foil layer, a sealant adhesion layer and a sealant layer laminated in this order, wherein the substrate layer is one made of either a polyamide film having a hot water shrinkage rate at 95° C. of less than 5% and a hot shrinkage rate at 180° C. of 4 to 16%, or a polyester film having a hot water shrinkage rate at 95° C. of less than 5% and a hot shrinkage rate at 180° C. of 10 to 25%.

Since the outer packaging material for electric storage device includes the substrate layer made of a polyamide film or a polyester film having a hot water shrinkage rate at 95° C. and a hot shrinkage rate at 180° C. within the above-defined ranges, respectively, the adhesion between the substrate layer and the metal foil layer during the fabrication of the battery and during use can be maintained while improving deep drawing formability. Accordingly, the outer packaging material for electric storage device can be improved in forming depth without causing the breakage between the adhesion layer and the metal foil layer, and also can suppress the peeling between the substrate layer and the metal foil layer from occurring over a long time even when subjected to exposure to heat (high temperature, hot water, and high temperature and high humidity) and/or also to an electrolytic solution.

Preferably, the outer packaging material for electric storage device further comprises an easy adhesion treatment layer provided between the substrate layer and the adhesion layer. In doing so, the adhesion between the substrate layer and the adhesion layer can be more improved along with more improved deep drawing formability.

In the outer packaging material for electric storage device, the easy adhesion treatment layer is preferably a layer containing at least one resin selected from the group consisting of a polyester resin, an acrylic resin a polyurethane resin, an epoxy resin and an acrylic grafted polyester resin. This allows the adhesion between the substrate layer and the adhesion layer to be more improved and also the deep drawing formability to be more improved.

Preferably, the outer packaging material for electric storage device further includes a corrosion inhibition treatment layer provided on the opposite surfaces of the metal foil layer. In doing so, the adhesion between the substrate layer and the metal foil layer can be more improved.

In the outer packaging material for electric storage device, the corrosion inhibition treatment layer preferably contains a rare earth metal oxide and phosphoric acid or a phosphate salt. This enables the adhesion between the substrate layer and the metal foil layer to be more improved.

In the outer packaging material for electric storage device, the rare earth metal oxide is preferably cerium oxide. Consequently, the adhesion between the substrate layer and the metal foil layer can be more improved.

The present invention also provides an electric storage device having a battery element including electrodes, leads extending from the electrodes, and a container for accommodating the battery element wherein the container is formed of the outer packaging material for electric storage device of the invention set out above in such a way that the sealant layer is arranged at the inner side thereof. With such an electric storage device, the container for accommodating the battery element makes use of the outer packaging material for electric storage device according to the invention, so that a deep recess can be formed in the container without breakage. With this electric storage device, where the outer packaging material is exposed to heat and/or an electrolytic solution, peeling between the substrate layer and the metal foil layer can be suppressed from occurring over a long period of time.

Advantageous Effect of the Invention

According to the present invention, there can be provided an outer packaging material for electric storage device which is able to maintain the adhesion between a substrate layer and a metal foil layer during the fabrication of a battery and during use while improving deep drawing formability and also an electric storage device using the same.

BRIEF DESCRIPTION OF THE DRAWINGS

FIGS. 2A and 2B are views showing an embossed outer packaging material for electric storage device according to an embodiment of the invention wherein FIG. 2A is a perspective view and FIG. 2B is a longitudinal sectional view taken along the b-b line in the embossed outer packaging material shown in FIG. 2A.

FIGS. 3A through 3D are perspective views showing the steps of fabricating a secondary battery using an outer packaging material according to an embodiment of the invention wherein FIG. 3A shows the state where an outer packaging material for electric storage device is provided, FIG. 3B shows the state wherein an embossed outer packaging material for electric storage device and a battery element are provided, respectively, FIG. 3C shows the state wherein part of the outer packaging material for electric storage device is doubled up with its end portion being molten, and FIG. 3D shows the state wherein both sides of the doubled-up portion is folded upwardly.

DESCRIPTION OF REPRESENTATIVE EMBODIMENTS

Figure 1:
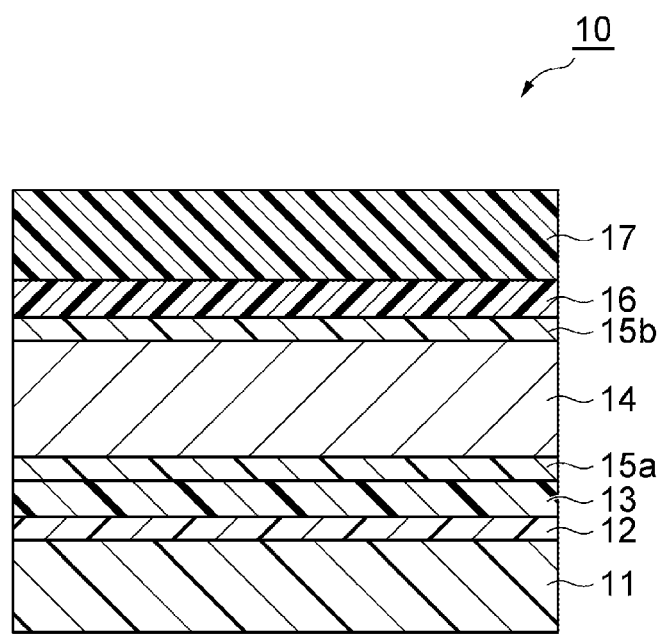
FIG. 1 is a schematic sectional view of an outer packaging material for electric storage device according to an embodiment of the invention.

Preferred embodiments of the present invention are now described in detail with reference to the accompanying drawings. It will be noted that in the drawings, the same or corresponding portions are indicated by the same reference numerals and the duplicate description thereof is omitted. It will be noted further that the following embodiments are representative of the present invention, and the present invention is not necessarily limited thereto.

[Outer Packaging Material for Electric Storage Device]

FIG. 1 is a sectional view schematically showing an embodiment of an outer packaging material for electric storage device of the invention. As shown in FIG. 1, an outer packaging material 10 (an outer packaging material for electric storage device) of this embodiment is a laminate including, as successively laminated, a substrate layer 11, an easy adhesion treatment layer 12 provided on one surface side of the substrate layer 11, an adhesion layer 13 provided on the side of the easy adhesion treatment layer 12 opposite to the substrate 11, a metal foil layer 14 provided on the side of the adhesion layer 13 opposite to the easy adhesion treatment layer 12 and having corrosion inhibition treatment layers 15a, 15b on both sides thereof, respectively, a sealant adhesion layer 16 provided on the side of the metal foil layer 14 opposite to the adhesion layer 13, and a sealant layer 17 provided on the side of the sealant adhesion layer opposite to the metal foil layer 14. The corrosion inhibition treatment layer 15a is provided on the surface of the adhesion layer 13 side of the metal foil layer 14 and the corrosion inhibition treatment layer 15b is provided on the surface of the sealant adhesion layer 16 side of the metal foil layer 14, respectively. The outer packaging material 10 includes the substrate layer 11 as an outermost layer and the sealant layer 17 as an innermost layer. In other words, the outer packaging material 10 is used in such a way that the substrate layer 11 faces an outer side of an electric storage device and the sealant layer 17 faces an inner side of the electric storage device. The individual layers are illustrated below.

(Substrate Layer 11)

The substrate layer 11 is one which imparts, to the outer packaging material 10, a heat resistance in a thermal compression fusion bonding step, described hereinafter, in the course of the fabrication of an electric storage device and an electrolytic solution resistance with respect to an electrolytic solution leaked out from other electric storage devices thereby suppressing the generation of pinholes that might occur during processing or distribution. The substrate 11 is a layer made of a polyamide film having a hot water shrinkage rate of less than 5% at 95° C. and a hot shrinkage rate of from 4 to 16% at 180° C., or a polyester film having a hot water shrinkage rate of less than 5% at 95° C. and a hot shrinkage rate of from 10 to 25% at 180° C.

The hot water shrinkage rate at 95° C. is a value measured according to the following method. More particularly, the hot water shrinkage rate at 95° C. is one determined such that a test piece obtained by cutting a substrate layer 11 to a size of 10 cm in length×10 cm in width is immersed in hot water at 95° C. for 30 minutes and rates of dimensional change in the longitudinal and transverse directions (in two intersecting directions) of the test piece prior to and after the immersion are determined based on the following equation (I) for calculation as an average value of the rates of dimensional change in the two directions. It will be noted that the longitudinal and transverse directions of the test piece are the same as in the case of the hot water shrinkage rate at 95° C. The lengthwise direction and the lateral direction of the test piece should match the MD direction (mechanical-feed direction) of the raw material of the substrate layer and the TD direction (perpendicular to the MD direction), respectively. In other words, if the substrate layer 11 is formed of a biaxially stretched film, the lengthwise or lateral direction of the text piece should match either one of the two directions in which the film is stretched.

The hot shrinkage rate at 180° C. is calculated in such a way that a test piece obtained by cutting out the substrate layer 11 into a size of 10 cm in length×10 cm in width is heated in an oven of 180° C. for 30 minutes. Thereafter, a dimensional variation ratio prior to and after the heating in the lengthwise direction and the lateral direction (intersecting two directions) is determined based on the following equation (I) and the rate is calculated as an average value of the dimensional variation ratios in the two directions. It will be noted that the lengthwise and lateral directions of the test piece is similar to the case of the hot water shrinkage rate at 95° C.

$$\text{Rate of dimensional change (\%)} = \{(X-Y)/X\}*100 \quad (I)$$

wherein X is a dimension prior to the immersion treatment in hot water or prior to the heating treatment in the oven. Y is a dimension posterior to the immersion treatment in hot water or posterior to the heating treatment in the oven.

The substrate layer 11, which is made of a polyamide film having a hot water shrinkage rate of less than 5% at 95° C. and a hot shrinkage rate of from 4 to 16% at 180° C., is called "substrate layer 11a". The substrate layer 11, which is made of a polyester film having a hot water shrinkage rate of less than 5% at 95° C. and a hot shrinkage rate of from 10 to 25% at 180° C., is called "substrate layer 11b". These substrates are, respectively, described below.

(Substrate Layer 11a)

The polyamide film used for the substrate layer 11a is set at less than 5% with respect to its hot water shrinkage rate at 95° C., under which where the outer packaging material 10 is exposed to heat and/or an electrolytic solution, the occurrence of peeling between the substrate layer 11a and the metal foil layer 14 can be suppressed over a long period of time. In order that the occurrence of peeling between the substrate layer 11a and the metal foil layer 14 can be suppressed over a longer period of time, the hot water shrinkage rate at 95° C. of the polyamide film is preferably at not larger than 4%. From a similar point of view, the hot water shrinkage rate at 95° C. of the polyamide film is preferably set at not less than 0%.

When the polyamide film serving as the substrate layer 11a has a hot shrinkage rate at 180° C. of not less than 4%, the outer packaging material 10 can be improved in deep drawing formability, and a formed depth enabling deep-drawing forming without breakage between the adhesion layer 13 and the metal foil layer 14. From the standpoint that deep drawing formability is more improved, the hot shrinkage rate at 180° C. of the polyamide film is preferably set at not less than 5%. On the other hand, the hot shrinkage rate at 180° C. of the polyamide film serving as the substrate layer 11a is set at not larger than 16%, under which where the outer packaging material 10 is exposed to heat and/or an electrolytic solution, the occurrence of peeling between the substrate layer 11a and the metal foil layer 14 can be suppressed over a long period of time. Additionally, the generation of heat wrinkles caused by heat shrinkage occurring during fabrication can be prevented.

The substrate layer 11a is preferably one that is made of a biaxially stretched polyamide film from the standpoint that more excellent deep drawing formability can be obtained.

The polyamide resins used for the biaxially stretched polyamide film include, for example, nylon 6, nylon 6,6, a copolymer of nylon 6 and nylon 6,6, nylon 6,10, polymethaxylylene adipamide (MXD6), nylon 11, nylon 12 and the like. Of these, nylon 6 (ONy) is preferred from the viewpoint of excellent heat resistance, piercing strength and impact strength.

The stretching method for the biaxially stretched film includes, for example, a sequential, biaxially stretching method, a tubular, biaxially stretching method, a simultaneous, biaxially stretching method and the like. The biaxially stretched film is preferably one stretched by the tubular, biaxially stretching method in view of the fact that more excellent deep drawing formability is obtained.

The thickness of the substrate layer 11a is preferably from 6 to 40 µm, more preferably from 10 to 30 µm. If the thickness of the substrate layer 11a is at not less than 6 µm, there is a tendency that the outer packaging material 10 for electric storage device can be improved in pinhole resistance and insulating properties. When the thickness of the substrate layer 11a exceeds 40 µm, the total thickness of the outer packaging material 10 for electric storage device becomes too large, which is not favorable due to the possibility that the electric capacity of the battery has to be reduced.

(Substrate Layer 11b)

In the outer packaging material 10, where the hot water shrinkage rate at 95° C. of a polyester film serving as the substrate layer 11b is less than 5% and is exposed to heat and/or an electrolytic solution, the occurrence of peeling between the substrate 11b and the metal foil layer 14 can be suppressed over a long period of time. Since the occurrence of peeling between the substrate layer 11b and the metal foil layer 14 can be suppressed over a longer period of time, the hot water shrinkage rate at 95° C. of the polyester film is preferably at not less than 4%. From a similar viewpoint, it is preferred that the hot water shrinkage rate at 95° C. of the polyester film is not less than 0%.

In the outer packaging material 10, when the hot shrinkage rate at 180° C. of the polyester film serving as the substrate layer 11b is set at not less than 10%, deep drawing formability can be improved and a formed depth enabling deep drawing forming can be improved without causing breakage between the adhesion layer 13 and the metal foil layer 14. On the other hand, the hot shrinkage rate at 180° C. of the polyester film serving as the substrate layer 11b is set at not larger than 25%, under which where the outer packaging material 10 is exposed to heat and/or an electrolytic solution, the occurrence of peeling between the substrate layer 11b and the metal foil layer 14 can be suppressed over a long period of time. Additionally, the generation of heat wrinkles caused by heat shrinkage occurring during fabrication can be prevented.

From the standpoint that more excellent deep drawing formability is obtained, the substrate layer 11b is preferably one made of a biaxially stretched polyester film.

The polyester resins used to constitute the biaxially stretched polyester film include, for example, polyethylene terephthalate, polybutylene terephthalate, polyethylene naphthalate, polybutylene naphthalate, copolymerized polyesters and the like.

The stretching method for the biaxially stretched film includes, for example, a sequential, biaxially stretching method, a tubular, biaxially stretching method, a simultaneous, biaxially stretching method and the like. From the viewpoint that more excellent deep drawing formability is obtained, a preferred biaxially stretched film is one obtained by the tubular, biaxially stretching method or the simultaneous, biaxially stretching method.

The thickness of the substrate layer 11b is preferably from 6 to 40 μm, more preferably from 10 to 30 μm. Since the thickness of the substrate layer 11b is not less than 6 μm, the pinhole resistance and insulating properties of the outer packaging material 10 tend to be improved. When the thickness of the substrate layer 11b exceeds 40 μm, the total thickness of the outer packaging material 10 for electric storage device becomes so large, which is not favorable due to the possibility that the electric capacity of a battery has to be reduced.

(Easy Adhesion Treatment Layer 12)

The easy adhesion treatment layer 12 is provided on one surface side of the substrate layer 11 and is located between the substrate layer 11 and the adhesion layer 13. The easy adhesion treatment layer 12 is one which improves the adhesion between the substrate layer 11 and the adhesion layer 13 and eventually improves the adhesion between the substrate layer 11 and the metal foil layer 14. In the outer packaging material 10 for electric storage device, the easy adhesion treatment layer 12 may not be provided. In this case, the surface of the substrate 11 at the side of the adhesion layer 13 may be subjected to corona treatment so as to improve the adhesion between the substrate layer 11 and the adhesion layer 13 and eventually improve the adhesion between the substrate layer 11 and the metal foil layer 14.

The easy adhesion treatment layer 12 is preferably a layer containing at least one type of resin selected from the group consisting of a polyester resin, an acrylic resin, a polyurethane resin, an epoxy resin and an acrylic grafted polyester resin. Such an easy adhesion treatment layer 12 can be formed on one surface of the substrate 11, for example, by coating a coating agent made mainly of a polyester resin, an acrylic resin, a polyurethane resin, an epoxy resin and an acrylic grafted polyester resin.

<Polyester Resin>

In view of adhesion, the polyester resin is preferably a copolymerized polyester, into which a copolymerizable component is introduced so as to lower a glass transition temperature. The copolymerized polyester should preferably have water solubility or water dispersibility from the standpoint of coatability. As such a copolymerized polymer, it is preferred to use a copolymerized polyester bonded with at least one group selected from the group consisting of a sulfonic acid group and an alkali metal base thereof (hereinafter referred to as "sulfonic acid group-containing copolymerized polyester").

The sulfonic acid group-containing copolymerized polyesters used herein mean polyesters of the type wherein at least one group selected from the group consisting of a sulfonic acid group and its alkali metal base is bonded to part of a dicarboxylic acid component or a glycol component. Of these, a preferred copolymerized polyester is of the type which is prepared by using an aromatic dicarboxylic acid component containing at least one group selected from the group consisting of a sulfonic acid group and its alkali metal base at a ratio of 2 to 10 mol % relative to the total acid components.

Examples of the dicarboxylic acid favorably include 5-sodium sulfoisophthalic acid. In this case, other types of dicarboxylic acid components include terephthalic acid, isophthalic acid, phthalic acid, p-β-oxyethoxybenzoic acid, 2,6-naphthalene dicarboxylic acid, 4,4'-dicarboxydiphenyl, 4,4'-dicarboxybenzophenone, bis(4-carboxyphenyl)ethane, adipic acid, sebacic acid, cyclohexane-1,4-dicarboxylic acid, and the like Ethylene glycol is mainly used as a glycol component used to prepare a sulfonic acid group-containing copolymerized polyester. Besides, there can be used propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like. Of these, the use, as a copolymerizable component, of ethylene glycol, propylene glycol, butanediol, neopentyl glycol, diethylene glycol, cyclohexane dimethanol or the like is preferred in that compatibility with a polystyrene sulfonate salt is improved.

The polyester resin used may include modified polyester copolymers such as, for example, block copolymers, grafted copolymers and the like, which are modified with polyester, urethane, epoxy and the like compounds. In this embodiment, in order to improve the adhesion between the easy adhesion treatment layer 12 and the substrate layer 11 and with the adhesion layer 13, the easy adhesion treatment layer 12 may further contain a resin other than the polyester resin. Such a resin includes, for example, a urethane resin, an acrylic resin or the like.

<Acrylic Resin>

The monomer components constituting an acrylic resin include, for example: alkyl acrylates and alkyl methacrylates (wherein the alkyl group includes a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group or the like); hydroxy group-containing monomers such as 2-hydroxyethyl acrylate, 2-hydroxyethyl methacrylate, 2-hydroxypropyl acrylate, 2-hydroxypropyl methacrylate and the like; amide group-containing monomers such as acrylamide, methacrylamide, N-methylacrylamide, N-methylmethacrylamide, N-methylolacrylamide, N-methylolmethacrylamide, N,N-dimethylolacrylamide, N-methoxymethylacrylamide, N-methoxymethylmethacrylamide, N-phenylacrylamide and the like; amino group-containing monomers such as N,N-diethylaminoethyl acrylate, N,N-diethylaminoethyl methacrylate and the like; epoxy group-containing monomers such as glycidyl acrylate, glycidyl methacrylate and the like; and monomers containing a carboxyl group or its salt such as acrylic acid, methacrylic acid and salts thereof (lithium salt, sodium salt, potassium salt or the like). These may be used singly, or two or more thereof may be copolymerized. Moreover, monomers other than those indicated above may also be used in combination.

Other types of monomers include, for example: epoxy group-containing monomers such as allyl glycidyl ether and the like; sulfonic acid group or its salt-containing monomers such as styrene sulfonic acid, vinyl sulfonic acid and salts thereof (lithium salt, sodium salt, potassium salt, ammonium salt and the like); carboxylic acid group or its salt-containing monomers such as crotonic acid, itaconic acid, maleic acid, fumaric acid and salts thereof (lithium salt, sodium salt, potassium salt, ammonium salt and the like); acid anhydride-containing monomers such as maleic anhydride, itaconic anhydride and the like; and vinyl isocyanate, allyl isocyanate, styrene, vinyl methyl ether, vinyl ethyl ether, a vinyl trisalkoxysilane, an alkylmaleic acid monoester, an alkylfumaric acid monoester, acrylonitrile, methacrylonitrile, an alkylitaconic acid monoester, vinylidene chloride, vinyl acetate, vinyl chloride and the like. Usable acrylic resins may include modified acrylic resins, e.g. polyester, urethane or epoxy-modified block copolymers and grafted copolymers.

Although the glass transition point (Tg) of the acrylic resin used in the present embodiment is not specifically limited, it is preferably from 0 to 90° C., more preferably from 10 to 80° C. If Tg is low, adhesion under high temperature and high humidity conditions may lower, or if Tg is high, cracking may occur during stretching, so that Tg of the acrylic resin is preferably within the range indicated above from the standpoint of avoiding the above problems.

The weight average molecular weight of the acrylic resin used in the present embodiment is preferably not less than 100,000, more preferably not less than 300,000. If the weight average molecular weight is low, humidity and heat resistances may lower in some cases. In the present embodiment, in order to improve the adhesion between the easy adhesion layer 12 and the substrate layer 11 and with the adhesive layer 13, a resin other than an acrylic resin may be contained in the easy adhesion treatment layer 12. Such a resin includes, for example, a polyester resin, a urethane resin or the like.

<Urethane Resin>

A preferred urethane resin is an aqueous polyurethane resin. The aqueous polyurethane resin is preferably of a self-emulsifying type from the standpoint of its small particle size and good stability. The particle size of the aqueous polyurethane resin is favorably approximately from 10 to 100 nm. The aqueous polyurethane resin used in the embodiment should preferably have a glass transition point (Tg) of 40° C. to 150° C. If Tg is not lower than 40° C., there is a tendency of preventing the occurrence of blocking in the course of winding in a roll after coating. On the other hand, when Tg is higher than a drying temperature after coating, difficulty is involved in forming a uniform film, for which Tg is preferably not higher than 150° C.

In the present embodiment, a crosslinking agent may be used along with the aqueous polyurethane resin. As a crosslinking agent for the aqueous polyurethane resin, there can be used a water-soluble epoxy compound and a general-purpose water-soluble crosslinking agent. The water soluble epoxy compound is one that is soluble in water and has two or more epoxy groups. The water-soluble epoxy compound includes a polyepoxy compound, which is obtained by esterification between 1 mol of a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, neopentyl glycol or the like, and 2 mols of epichlorohydrin; and a diepoxy compound, which is obtained by esterification between 1 mol of a dicarboxylic acid such as phthalic acid, terephthalic acid, adipic acid, succinic acid or the like and 2 mols of epichlorohydrin. In this regard, however, the water-soluble epoxy compound is not limited thereto.

These water-soluble crosslinking agents contribute to improving the water and solvent resistances of the resulting film by crosslinkage with the aqueous polyurethane resin and also improving the adhesion between the easy adhesion treatment layer 12 and the substrate layer 11 and with the adhesion layer 13. In the present embodiment, a resin other than the urethane resin may be further contained in order to improve the adhesion between the easy adhesion treatment layer 12 and the substrate 11 and with the adhesion layer 13. Such a resin includes, for example, a polyester resin, an acrylic resin or the like.

Further, the easy adhesion treatment layer 12 may be constituted, for example, in such a way that there are contained the above resin serving as a main component and a curing agent such as a polyfunctional isocyanate, a polyfunctional glycidyl compound, a melamine compound or the like. When the resin serving as a main component and a curing agent such as a polyfunctional isocyanate, a polyfunctional glycidyl compound, a melamine compound or the like are contained, a crosslinked structure can be taken in thereby enabling the provision of a hard-line easy adhesion treatment layer 12.

The coating agent used to form the easy adhesion treatment layer 12 may be either a solvent one or an aqueous one. A dispersion type (dispersion) using an aqueous main agent is large in molecular weight and is improved in intermolecular cohesive force, and is thus effective for the adhesion between the easy adhesion treatment layer 12 and the substrate layer 11 and with the adhesion layer 13.

The thickness of the easy adhesion treatment layer 12 is preferably from 0.02 to 0.5 μm, more preferably from 0.04 to 0.3 μm. If the thickness of the easy adhesion treatment layer 12 is 0.02 μm or over, a uniform easy adhesion treatment layer 12 is likely to be formed with a tendency that a better easy adhesion effect is obtained. On the other hand, when the thickness of the easy adhesion treatment layer 12 is 0.5 μm or below, there is a tendency that deep drawing formability of the resulting outer packaging material 10 can be more improved.

(Adhesion Layer 13)

The adhesion layer 13 is a layer for adhesion between the substrate layer 11 and the metal foil layer 14. The adhesion layer 13 bonds to the substrate layer 11 through the easy adhesion treatment layer 12. The adhesion layer 13 has an adhesion force required for strong adhesion between the substrate layer 11 and the metal foil layer 14 and also has followability (i.e. capability of reliably forming the adhesion layer 13 on a member without peeling when the member is deformed, or elongated or contracted) for suppressing the metal foil layer 14 from being broken by the substrate layer 11 during cold molding.

As an adhesive constituting the adhesion layer 13, there can be used a two-part curing type polyurethane adhesive comprising, for example, a main agent made of a polyol such as a polyester polyol, a polyether polyol, an acrylic polyol or the like, and a curing agent such as an aromatic or aliphatic isocyanate. In this adhesive, the molar ratio (=NCO/OH) of the isocyanate groups of the curing agent to the hydroxyl groups of the main agent is preferably from 1 to 10, more preferably from 2 to 5.

After coating, the polyurethane adhesive is aged, for example, at 40° C. for 4 days or over, during which the reaction between the hydroxyl groups of the main agent and the isocyanate groups of the curing agent proceeds thereby enabling stronger adhesion between the substrate layer 11 and the metal foil layer 14.

The thickness of the adhesion layer 13 is preferably from 1 to 10 μm, more preferably from 2 to 6 μm from the standpoint of obtaining desired adhesion strength, followability, processability and the like.

(Metal Foil Layer 14)

As the metal foil layer 14, mention is made of various types of metal foils such as aluminum, stainless steel and the like, and the metal foil layer 14 is preferably made of an aluminum foil from the standpoint of moisture proofness, processabilities such as spreadability, and costs. Although the aluminum foil may be an ordinary soft aluminum foil, an aluminum foil containing iron is preferred from the viewpoint of the excellence in pinhole resistance and spreadability upon forming.

In the iron-containing aluminum foil (100 mass %), the content of iron is preferably from 0.1 to 9.0 mass %, more preferably from 0.5 to 2.0 mass %. When the content of iron is not less than 0.1 mass %, there can be obtained an outer packaging material 10 having more excellent pinhole resistance and spreadability. When the content of iron is not larger than 9.0 mass %, a more flexible outer packaging material 10 can be obtained.

A more preferred aluminum foil is a soft aluminum foil subjected to annealing treatment (e.g. an aluminum foil made of 8021 material or 8079 material defined in JIS standards) from the viewpoint of the capability of imparting desired spreadability upon forming.

The metal foil used as the metal foil layer 14 should preferably be subjected, for example, to defatting treatment so as to obtain a desired resistance to electrolytic solution. For the purpose of simplifying the fabrication process, it is preferred that the metal foil is not etched on the surface thereof. The defatting treatment includes, for example, a wet type defatting treatment or a dry type defatting treatment. From the standpoint of simplifying the fabrication process, the dry type defatting treatment is preferred.

The dry type defatting treatment includes, for example, a method wherein in the step of subjecting a metal foil to annealing treatment, the defatting treatment is carried out in such a way that a treatment time is elongated. A satisfactory resistance to electrolytic solution can be obtained in such an extent that the defatting treatment is performed simultaneously with the annealing treatment for softening the metal foil.

For the dry type defatting treatment, treatments such as a flame treatment and a corona treatment other than the above annealing treatment may also be used. Moreover, a usable dry type defatting treatment includes, for example, a defatting treatment wherein contaminants are oxidatively decomposed and removed by means of active oxygen generated by irradiation of ultraviolet light of a specific wavelength on a metal foil.

As to the wet type defatting treatment, there can be used, for example, treatments such as an acid defatting treatment, an alkali defatting treatment and the like. The acids used in the acid defatting treatment include, for example, inorganic acids such as sulfuric acid, nitric acid, hydrochloric acid, hydrofluoric acid and the like. These acids may be used singly or in combination of two or more. The alkalis used in the alkali defatting treatment include, for example, sodium hydroxide having a high etching effect. The alkali defatting treatment may be performed using a material formulated with a weakly alkaline material and a surface active agent. The wet type defatting treatments described above can be carried out, for example, by an immersion method or a spraying method.

In view of barrier properties, a pinhole resistance and processability, the thickness of the metal foil layer 14 is preferably from 9 to 200 μm, more preferably from 15 to 150 μm and much more preferably from 15 to 100 μm. If the thickness of the metal foil layer 14 is not less than 9 μm, breakage that might occur to the stress exerted during forming is less likely to occur. If the thickness of the metal foil layer 14 is not larger than 200 μm, the increase in weight of the outer packaging material can be reduced and the lowering of the weight energy density of an electric storage device can be suppressed.

(Corrosion Inhibition Treatment Layers 15a, 15b)

The corrosion inhibition treatment layers 15a, 15b act to prevent the corrosion of the metal foil layer 14 with an electrolytic solution or hydrofluoric acid generated by reaction between the electrolytic solution and moisture. Additionally, the corrosion inhibition treatment layer 15a also acts to enhance the adhesion force between the metal foil layer 14 and the adhesion layer 13. Likewise, the corrosion inhibition treatment layer 15b serves to enhance the adhesion force between the metal foil layer 14 and the sealant adhesion layer 16. The corrosion inhibition treatment layer 15a and the corrosion inhibition treatment layer 15b may be, respectively, a layer having the same composition or layers having different compositions.

The corrosion inhibition treatment layers 15a, 15b can be formed, for example, by subjecting a layer, which serves as a matrix material for the respective corrosion inhibition treatment layers 15a, 15b, to defatting treatment, hot water conversion treatment, anodization treatment, chemical conversion treatment, coating-type corrosion inhibition treatment wherein a coating agent having corrosion inhibition ability is coated, or a combination of these treatments.

Of the above-indicated treatments, the defatting treatment, the hot water conversion treatment and the anodization treatment, particularly, the hot water conversion treatment and the anodization treatment, are those treatments wherein a metal foil (aluminum foil) is dissolved with a treating agent on the surface thereof to form a metal compound (aluminum compound (boehmite, alumite)) having an excellent corrosion resistance. In this sense, such treatments may be sometimes embraced within the definition of chemical conversion treatments because they provide such a structure that a co-continuous structure covering from the metal foil layer 14 to the corrosion inhibition treatment layers 15a, 15b are formed.

The defatting treatment includes acid defatting and alkali defatting. As the acid defatting, mention is made of a method using acid defatting with an inorganic acid indicated above, such as sulfuric acid, nitric acid, hydrochloric acid, hydrofluoric acid or the like. These may be used singly or in combination. As to the acid defatting, when using an acid defatting agent obtained by dissolving a fluorine-containing compound, such as ammonium sodium difluoride, in such an inorganic acid as indicated above, not only a defatting effect on the metal foil layer 14, but also the formation of a metal fluoride in passive state is enabled, thus being effective in view of a resistance to hydrofluoric acid. As the alkali defatting, a method using sodium hydroxide can be mentioned.

For the hot water conversion treatment, there can be used, for example, a boehmite treatment achieved by immersing the metal foil layer 14 in boiled water, to which triethanolamine is added. As an anodization treatment, there can be used an alumite treatment, for example. The chemical conversion treatment used includes, for example, a chromate treatment, a zirconium treatment, a titanium treatment, a vanadium treatment, a molybdenum treatment, a calcium phosphate treatment, strontium hydroxide treatment, a cerium treatment, a ruthenium treatment or a combination of two or more thereof. As to the hot water conversion treatment, the anodization treatment and the chemical conversion treatment, it is preferred to preliminarily perform such a defatting treatment as described above.

It will be noted that the chemical conversion treatment is not limited to a wet method, but there may be used, for example, a method wherein a treating agent used in these treatments is mixed with a resin component and coated. A preferred corrosion inhibition treatment is a coating type chromate treatment from the standpoint of waste liquid treatment along with the maximization of its effect.

The coating agent used in the coating type corrosion inhibition treatment wherein a coating agent having corrosion inhibition ability is coated includes one which contains at least one selected from the group consisting of a rare earth element oxide sol, an anionic polymer and a cationic polymer. Especially, a preferred method is one using a coating agent containing a rare earth element oxide sol.

The method using a coating agent containing a rare earth element oxide sol is a pure coating type corrosion inhibition treatment. When using this method, a corrosion inhibition effect can be imparted to the metal foil layer 14 even according to ordinary coating methods. The layer formed by use of a rare earth element oxide sol has a corrosion inhibition effect (inhibitor effect) on the metal foil layer 14 and the sol is a favorable material from an environmental aspect.

The rare earth element oxide sol are such that fine particles (e.g. particles having an average particle size of not larger than 100 nm) of a rare earth element oxide are dispersed in a liquid dispersion medium. The rare earth element oxide includes cesium oxide, yttrium oxide, neodymium oxide, lanthanum oxide or the like. Of these, cerium oxide is preferred. This enables the adhesion with the metal foil layer 14 to be more improved. As a liquid dispersion medium of the rare earth element oxide sol, there can be used a variety of solvents such as water, an alcohol solvent, a hydrocarbon solvent, a ketone solvent, an ester solvent, an ether solvent and the like. Of these, water is preferred. The rare earth element oxides contained in the corrosion inhibition treatment layers 15a, 15b may be used singly or in combination of two or more thereof.

In order to stabilize the dispersion of the particles of a rare earth element oxide, the rare earth element oxide sol should preferably contain, as a dispersion stabilizer, an inorganic acid such as nitric acid, hydrochloric acid, phosphoric acid or the like, an organic acid such as acetic acid, malic acid, ascorbic acid, lactic acid or the like, or a salt thereof. Of these dispersion stabilizers, phosphoric acid or phosphate salts are preferred. In doing so, there can be expected not only dispersion stabilization of the particles of a rare earth element oxide, but also effects of improving the adhesion with the metal foil layer 14 by making use of the chelating ability of phosphoric acid, imparting a resistance to electrolytic solution by the capture of metal ions (the formation of a passive state) dissolved out by the influence of hydrofluoric acid, and improving the cohesion force of the rare earth element oxide layer due to the likelihood of dehydration condensation of phosphoric acid even at low temperature in the applications of an outer packaging material for lithium ion battery. The phosphoric acid or phosphate salts used as a dispersion stabilizer include, for example, orthophosphoric acid, pyrophosphoric acid, metaphosphoric acid, and alkali metal salts and ammonium salts thereof. Of these, condensed phosphoric acids such as trimetaphosphoric acid, tetrametaphosphoric acid, hexametaphosphoric acid, ultrametaphosphoric acid and the like, or alkali metal salts and ammonium salts thereof are preferred in view of their functional development for use as an outer packaging material for lithium ion battery. Especially, when consideration is taken to dry film formability (drying capability or amount of heat) at the time when a layer containing a rare earth element oxide is formed according to any of various coating methods using a coating composition containing the rare earth element oxide sol, an agent having excellent reactivity at low temperature is preferred. From the standpoint of dehydration condensation at low temperature, sodium salts are preferred. The phosphate salt is preferably a water-soluble one. The phosphoric acids or phosphate salts contained in the corrosion inhibition treatment layers 15a, 15b may be used singly or in combination of two or more.

The amount of the phosphoric acid or its salt in the rare earth element oxide sol is preferably not less than 1 mass by part, more preferably not less than 5 parts by mass, per 100 parts by mass of the rare earth element oxide. If not less than 1 part by mass, not only the sol is well stabilized, but also it is easy to satisfy the function as an outer packaging material for lithium ion battery. The upper limit of the amount of the phosphoric acid or its salt per 100 parts by mass of the rare earth element oxide may be within a range not lowering the function of the rare earth element oxide sol, and is preferably not larger than 100 parts by mass, more preferably not larger than 50 parts by mass, and much more preferably not larger than 20 parts by mass, per 100 parts by mass of the rare-earth element oxide.

The layer formed from the rare earth element oxide sol is an aggregate of inorganic particles and the cohesive force of the layer itself is low even after through a dry curing step. In order to compensate the cohesive force, complexing with an anionic polymer is favorable.

The anionic polymer includes polymers having a carboxyl group. Examples include poly(meth)acrylic acid (or its salt), or a copolymer obtained by copolymerizing poly(meth)acrylic acid as a main component. The copolymerizable component of the copolymer includes: an alkyl (meth)acrylate monomer (wherein an alkyl group is a methyl group, an ethyl group, an n-propyl group, an i-propyl group, an n-butyl group, an i-butyl group, a t-butyl group, a 2-ethylhexyl group, a cyclohexyl group or the like); (meth)acryl amide, an N-alkyl (meth)acrylamide or an N,N-dialkyl (meth)acrylamide (wherein the alkyl group is a methyl group, an ethyl group, an n-propyl group, an i-propyl group, an n-butyl group, an i-butyl group, a t-butyl group, a 2-ethylhexyl group, a cyclohexyl group or the like); an N-alkoxy meth(acryl)amide or an N,N-dialkoxy (meth)acrylamide (wherein the alkoxy group is a methoxy group, an ethoxy group, a butoxy group, an isobutoxy group or the like); an amide-group containing monomer such as N-methylol (meth)acrylamide, N-phenyl (meth)acrylamide or the like; a hydroxyl group-containing monomer such as 2-hydroxyethyl (meth)acrylate, 2-hydroxypropyl (meth)acrylate or the like; a glycidyl group-containing monomer such as glycidyl (meth)acrylate, allyl glycidyl ether or the like; a silane-containing monomer such as (meth)acryloxypropyltrimethoxysilane, (meth)acryloxypropyltriethoxysilane or the like; or an isocyanate group-containing monomer such as (meth)acryloxypropyl isocyanate or the like. In addition, mention may be further made of styrene, α-methylstyrene, vinyl methyl ether, vinyl ethyl ether, maleic acid, an alkyl maleic acid monoester, fumaric acid, an alkyl fumaric acid monoester, itaconic acid, an alkyl itaconic acid monoester, (meth)acrylonitrile, vinylidene chloride, ethylene, propylene, vinyl chloride, vinyl acetate, butadiene and the like.

The anionic polymer acts to improve the stability of the corrosion inhibition treatment layers 15a, 15b (oxide layers) obtained by use of a rare earth element oxide sol. This is achieved by the effect of protecting the hard, brittle oxide layer with an acrylic resin component and also by the effect of capturing ionic contaminants (especially, sodium ions) (cation catcher) derived from the phosphate salt contained in the rare earth element oxide sol. More particularly, when alkali metal ions, particularly sodium ions, or alkaline earth metal ions are contained in the corrosion inhibition treatment layers 15a, 15b obtained by use of the rare earth element oxide sol, the corrosion inhibition treatment layers 15a, 15b are apt to be deteriorated as originated from sites containing the ions. To avoid this, when the sodium ions and the like containing in the rare earth element oxide sol are fixed with an anionic polymer, the durability of the corrosion inhibition treatment layers 15a, 15b is improved.

The corrosion inhibition treatment layers 15a, 15b formed of a combination of an anionic polymer and a rare earth element oxide sol has corrosion inhibition ability substantially equal to that of corrosion inhibition treatment layers 15a, 15b formed by subjecting the metal foil layer 14 to chromate treatment. The anionic polymer should preferably have a structure wherein a substantially water-soluble a polyanionic polymer is crosslinked. The crosslinking agent used for the formation of the structure includes, for example, compounds containing an isocyanate group, a glycidyl group, a carboxy group, or an oxazoline group. Moreover, it is possible to introduce crosslinking sites having a siloxane bond by use of a silane coupling agent.

The compounds having an isocyanate group include, for example: diisocyanates such as tolylene diisocyanate, xylylene diisocyanate or its hydrogenated product, hexamethylene diisocyanate, 4,4'-diphenylmethane diisocyanate or its hydrogenated product, isophorone diisocyanate and the like; polyisocyanates including adducts of these isocyanates reacted with polyhydric alcohols such as trimethylolpropane, biuret products obtained by reaction of the isocyanates with water, or isocyanurates that are trimers of the isocyanates; or blocked polyisocyanates obtained by blocking these polyisocyanates with alcohols, lactams, oximes and the like.

The compounds having a glycidyl group include, for example: epoxy compounds obtained by reaction between glycols, such as ethylene glycol, diethylene glycol, triethylene glycol, polyethylene glycol, propylene glycol, dipropylene glycol, tripropylene glycol, polypropylene glycol, 1,4-butadiene, 1,6-hexanediol, neopentyl glycol and the like, and epichlorohydrin; epoxy compounds obtained by reaction between polyhydric alcohols, such as glycerine, polyglycerine, trimethylolpropane, pentaerythritol, sorbitol and the like, and epichlorohydrin; and epoxy compounds obtained by reaction between dicarboxylic acids, such as phthalic acid, terephthalic acid, oxalic acid, adipic acid and the like, and epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention is made of compounds obtained by copolymerizing therewith acrylic monomers such as (meth)acrylic acid, (meth) acrylic alkyl esters, hydroxylalkyl (meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. Especially, when consideration is taken to the reactivity with an anionic polymer, an epoxysilane, an aminosilane and an isocyanate silane are preferred.

The amount of the crosslinking agent is preferably from 1 to 50 parts by mass, more preferably from 10 to 20 parts by mass, per 100 parts by mass of an anionic polymer. When the ratio of the crosslinking agent is not less than 1 part by mass per 100 parts by mass of an anionic polymer, a crosslinked structure is likely to be satisfactorily formed. When the ratio of the crosslinking agent is not larger than 50 parts by mass per 100 parts by mass of an anionic polymer, the pot life of the resulting coating solution is improved.

The method of crosslinking an anionic polymer is not limited to one using the above crosslinking agent, but may be one wherein ionic crosslinkage is formed using a titanium or zirconium compound. These materials may be applied to a coating composition for forming the corrosion inhibition treatment layer 15a.

In the corrosion inhibition treatment layers 15a, 15b illustrated above, the corrosion inhibition treatment layers 15a, 15b formed by chemical conversion treatment, typical of which is chromate treatment, are formed such that in order to form an inclined structure in association with the metal foil layer 14, the metal foil layer 14 is treated with a chemical conversion treatment agent formulated, particularly, with hydrofluoric acid, hydrochloric acid, nitric acid, sulfuric acid or a salt thereof, followed by further reaction with a chromium or non-chromium compound to form a chemical conversion treatment layer on the metal foil layer 14. However, the chemical conversion treatment makes use of the acid, thus entailing environmental degradation and the corrosion of a coating apparatus.

On the other hand, with the coating-type corrosion inhibition treatment layer 15a, 15b stated above, it is unnecessary to form an inclined structure relative to the metal foil layer 14 unlike the chemical conversion treatment typified by chromate treatment. Accordingly, the nature of a coating agent suffers no limitation with respect to acidity, alkalinity and neutrality, so that a good working environment can be realized. Additionally, since the chromate treatment using a chromium compound is required to offer an alternative in terms of environmental sanitation, the coating type corrosion inhibition treatment layers 15a, 15b are preferred.

If necessary, the corrosion inhibition layers 15a, 15b may be, respectively, configured to have a laminate structure wherein a cationic polymer is stacked as a layer. The cationic polymer includes a polyethylene imine, an ionic polymer complex formed from a polyethylene imine and a polymer having a carboxylic acid, a primary amine-grafted acrylic resin wherein a primary amine is grafted to an acrylic main skeleton, a polyallylamine or a derivative thereof, an aminophenolic resin or the like.

The "polymer having a carboxylic acid" forming the ionic polymer complex includes, for example, a polycarboxylic acid (or salt), a copolymer obtained by introducing a comonomer to a polycarboxylic acid (or salt), a polysaccharide having a carboxy group and the like. Examples of the polycarboxylic acid (o salt) include polyacrylic acid and its ionic salt. Examples of the polysaccharide having a carboxy group include carboxymethyl cellulose and its ionic salt. The ionic salts include an alkali metal salt, an alkaline earth metal salt and the like.

The primary amine-grafted acrylic resin is of the type wherein a primary amine is grafted to an acrylic main skeleton. The acrylic main skeleton includes a variety of monomers used for such acrylic polyols as indicated before, such as poly(meth)acrylic acid. The primary amine grafted to the acrylic main skeleton includes an ethylene imine.

Usable polyallylamines or derivatives thereof include homopolymers or copolymers of an allylamine, an allylamine amide sulfate, a diallylamine, a dimethylallylamine and the like. Moreover, these amines may be used in the form of free amines or stabilized products with acetic acid or hydrochloric acid. Usable copolymer components include maleic acid, sulfur dioxide and the like. Moreover, compounds of the type imparted with thermal crosslinkability by partially methoxizing a primary amine may also be used. These cationic polymers may be used singly or in combination of two or more. Of these, a preferred cationic polymer includes at least one selected from the group consisting of polyallylamines and derivatives thereof.

The cationic polymer should preferably be used in combination with a crosslinking agent having a functional group capable of reaction with amine/imine, such as a carboxy group, a glycidyl group or the like. As the crosslinking agent used in combination with a cationic polymer, there may be used polymers having a carboxylic acid capable of forming an ionic polymer complex with a polyethylene imine. Examples include a polycarboxylic acid (salt) such as polyacrylic acid or an ionic salt thereof, or its copolymer introduced with a comonomer, and a polysaccharide having a carboxy group such as carboxymethyl cellulose or its ionic salt.

In the present embodiment, the cationic polymer is described as one constituent element for constituting the corrosion inhibition treatment layers 15a, 15b. The reason for this is that intensive studies have been made on a variety of compounds so as to impart resistances to electrolytic solution and hydrofluoric acid, which are required for an outer packaging material for lithium ion battery, eventually revealing that a cationic polymer itself is a compound capable of imparting the resistances to electrolytic solution and hydrofluoric acid. This is assumed because fluorine ions are captured with a cationic group (anion catcher) and the metal foil layer 14 is thus suppressed from being damaged. The cationic polymer is much preferred from the standpoint of improving the adhesion between the corrosion inhibition treatment layer 15b and the sealant adhesion layer 16. Since the cationic polymer is soluble in water like such an anionic polymer as indicated before, the water resistance can be improved by forming a crosslinked structure by use of the above-indicated crosslinking agent. As described above, the crosslinked structure can be formed even using a cationic polymer, so that where a rare earth element oxide sol is used to form the corrosion inhibition treatment layers 15a, 15b, a cationic polymer may be used as a protective layer in place of an anionic polymer.

As will be appreciated from the foregoing, examples of a combination of such coating type corrosion inhibition treatments include (1) rare earth element oxide sol alone, (2) anionic polymer alone, (3) cationic polymer alone, (4) rare earth element oxide sol+anionic polymer (laminated complex), (5) rare earth element oxide sol+cationic polymer (laminated complex), (6) (rare earth element oxide sol+ anionic polymer: laminated complex)/cationic polymer (multilayering), (7) (rare earth element oxide sol+cationic polymer: laminated complex)/anionic polymer (multilayering), and the like. Of these, (1) and (4) to (7) are preferred, of which (4) to (7) are more preferred. With the corrosion inhibition layer 15a, since the corrosion inhibition effect and anchoring effect (adhesion improving effect) can be realized by one layer, (6) is most preferred. With the corrosion inhibition treatment layer 15b, since the resistance to electrolytic solution at the side of the sealant layer 17 is more likely to be maintained, (6) and (7) are most preferred. In this regard, however, the present embodiment is not always limited to the above combinations. For instance, with respect to the selection of the corrosion inhibition treatments, a cationic polymer is very favorable in that it shows good adhesion with a modified polyolefin resin indicated for illustrating a sealant adhesion layer 16 described hereinafter. Accordingly, in the case where the sealant adhesion layer 16 is constituted of a modified polyolefin resin, it is possible to design a cationic polymer provided on a surface contacting the sealant adhesion layer 16 (e.g. configurations (5) and (6)).

In this regard, however, the corrosion inhibition treatment layers 15a, 15b are not limited to those layers set out above. For example, as with the case of the coating type chromate of the prior art, an agent of a resin binder (an amino phenolic resin or the like) formulated with phosphoric acid and a chromium compound may be used for the formation. The use of this treating agent is able to form a layer having both corrosion inhibition function and adhesion. In order to improve adhesion, a multiple treatment may be performed using such a cationic polymer and/or an anionic polymer as described above in place of the above-mentioned chemical conversion treatment layer (i.e. a layer formed by defatting treatment, hot water conversion treatment, anodization treatment, chemical conversion treatment or a combination thereof). Alternatively, a cationic polymer and/or an anionic polymer may be stacked to provide a multilayer structure instead of using a combination of the above treatments. Although the stability of a coating solution should be taken into account, the use of a coating agent obtained by mixing such a rare earth element oxide sol and a cationic polymer or an anionic polymer to provide a one-part agent beforehand enables the provision of a layer that has both corrosion inhibition function and adhesion.

The mass per unit area of the respective corrosion inhibition treatment layers 15a, 15b is preferably within a range of 0.005 to 0.200 g/m$^2$, more preferably within a range of from 0.010 to 0.100 g/m$^2$. If not less than 0.005 g/m$^2$, it is likely to impart a corrosion inhibition function to the metal foil layer 14. If the mass per unit area exceeds 0.200 g/m$^2$, the corrosion inhibition function is saturated and remains substantially unchanged. On the other hand, where a rare earth element oxide sol is used, a thick coated film becomes inadequate with respect to curing by application of heat during drying with concern that the lowering of a cohesive force results. It will be noted that in the above description, although the mass per unit area is used, a thickness can be calculated if a specific gravity is known.

The respective thicknesses of the corrosion inhibition treatment layers 15a, 15b are preferably, for example, from 10 nm to 5 µm, more preferably from 20 to 500 nm, from the standpoint of the corrosion inhibition function and an anchoring function.

(Sealant Layer 16)

The sealant layer 16 is a layer for adhesion between the metal foil layer 14, on which the corrosion inhibition layer 15b has been formed, and the sealant layer 17. The outer packaging material 10 can be broadly classified into a thermal lamination configuration and a dry lamination configuration depending on the type of adhesion component forming the sealant adhesion layer 16.

The adhesion component forming the sealant layer 16 in the thermal lamination configuration preferably includes an acid-modified polyolefin resin wherein a polyolefin resin is graft modified with an acid. The acid-modified polyolefin resin is such that a polar group is introduced to part of a non-polar polyolefin resin and thus can adhere strongly to both the sealant layer 17 in the case of being made of a non-polar polyolefin resin film or the like and the corrosion inhibition treatment layer 15b that has polarity in many cases. The use of the acid-modified polyolefin resin leads to improved resistance properties against a content of the outer packaging material 10, such as an electrolytic solution or the like and also to the likelihood of preventing the lowering of adhesion force due to the deterioration of the sealant adhesion layer 16 if hydrofluoric acid generates inside a battery.

The polyolefin resins used for the acid-modified polyolefin resin include, for example, low density, medium density and high density polyethylenes; ethylene-α-olefin copolymers; polypropylene; and propylene-α-olefin copolymers. The polyolefin resins in the form of a copolymer may be either block copolymers or random copolymers. As a polyolefin resin, there may be further used copolymers obtained by copolymerizing those indicated above with polar molecules such as of acrylic acid or methacrylic acid, or polymers such as crosslinked polyolefins. The acid used for modifying the polyolefin resin includes a carboxylic acid, an epoxy compound, an acid anhydride or the like, of which maleic anhydride is preferred. The acid-modified polyolefin resins used for the sealant adhesion layer 16 may be used singly or in combination of two or more.

The sealant adhesion layer 16 of the thermal lamination configuration can be formed by extruding the above adhesion component by an extruder. The sealant adhesion layer 16 of the thermal lamination configuration preferably has a thickness of 2 to 50 µm.

As an adhesion component forming the sealant adhesion layer 16 of the dry lamination configuration, mention is made, for example, of such adhesives as indicated with respect to the adhesion layer 13. In this case, in order to suppress the swelling with an electrolytic solution and the hydrolysis with hydrofluoric acid, it is preferred to design a composition of an adhesive comprising a main agent whose skeleton is unlikely to undergo hydrolysis and capable of improving a crosslinking density.

Where the crosslinking density is improved, it is favorable to add, to the adhesive, a dimer fatty acid, an ester or hydrogenated product of a dimer fatty acid, a reduced glycol of a dimer fatty acid, or a reduced glycol of an ester or hydrogenated product of a dimer fatty acid. The dimer fatty acids are those acids obtained by dimerizing a variety of unsaturated fatty acids and their structures include, for example, those of an acyclic type, a monocyclic type, a polycyclic type and aromatic type.

The fatty acid serving as a starting material of a dimer fatty acid is not specifically limited. When using such a dimer fatty acid as an essential component, a dibasic acid as used for ordinary polyester polyols may be introduced thereto. As a curing agent for the main agent constituting the sealant adhesion layer 16, there can be used isocyanate compounds usable as a chain extender of polyester polyols. This leads to an increased crosslinking density of the adhesive film and improvements in solubility and swellability. Additionally, an improvement in substrate adhesion can be expected due to the increased concentration of urethane groups.

The sealant adhesion layer 16 of the dry lamination configuration has highly hydrolyzable bonding sites such as of an ester group and a urethane group, so that in the applications requiring higher reliability, it is preferred to use an adhesion component of the thermal lamination configuration as the sealant layer 16. For instance, a coating solution, which is obtained by dissolving or dispersing an acid-modified polyolefin resin in a solvent such as toluene, methyl cyclohexane (MCH) or the like, is formulated with a variety of curing agents indicated above, coated and dried to form a sealant adhesion layer 16.

Where the sealant adhesion layer 16 is formed by extrusion molding, an adhesion resin is apt to be oriented toward an MD direction (extrusion direction) due to the stress generated upon extrusion molding. In this case, in order to mitigate the anisotropy of the sealant adhesion layer 16, an elastomer may be formulated in the sealant adhesion layer 16. The elastomers formulated in the sealant adhesion layer 16 include, for example, olefinic elastomers, styrene elastomers and the like.

The average particle size of the elastomer is preferably one which is able to improve the compatibility between the elastomer and an adhesion resin and also to improve an effect of mitigating the anisotropy of the sealant adhesion layer 16. In particular, the average particle size of the elastomer is preferably not large than 200 nm.

It will be noted that the average size of the elastomer is determined, for example, by taking an enlarged photograph of a section of an elastomer composition by an electron microscope and measuring an average particle size of a dispersed, crosslinked rubber component by image analysis. The above-indicated elastomers may be used singly or in combination of two or more.

Where an elastomer is formulated in the sealant adhesion layer 16, the amount of the elastomer added to the sealant adhesion layer 16 (100 mass %) is preferably, for example, from 1 to 25 mass %, more preferably from 10 to 20 mass %. When the amount of the elastomer is set at not less than 1 mass %, compatibility with an adhesion resin is improved, with a tendency that the effect of mitigating the anisotropy of the sealant adhesion layer 16 is improved. When the amount of the elastomer is set at not larger than 25 mass %, there is a tendency that an effect of suppressing the swelling of the sealant adhesion layer 16 with an electrolytic solution is improved.

For the formation of the sealant adhesion layer 16, there may be used, for example, an adhesion resin solution of a dispersion type wherein an adhesion resin is dispersed in an organic solvent.

The thickness of the sealant adhesion layer 16 is preferably from 8 µm to 50 µm, more preferably from 20 µm to 40 µm, for the thermal lamination configuration. When the thickness of the sealant adhesion layer 16 is not less than 8 µm, satisfactory adhesion strength between the metal foil layer 14 and the sealant adhesion layer 17 is likely to be obtained. If the thickness is not more than 50 µm, the amount of moisture infiltrated from the end faces of an outer packaging material to an internal battery element can be easily reduced. The thickness of the sealant adhesion layer 16 is preferably from 1 μm to 5 μm for the dry lamination configuration. If the thickness of the sealant adhesion layer 16 is not less than 1 μm, satisfactory adhesion strength between the metal foil layer 14 and the sealant layer 17 is likely to be obtained. If the thickness is not more than 5 μm, the generation of cracks of the sealant adhesion layer 16 can be suppressed.

(Sealant Layer 17)

The sealant layer 17 is a layer that imparts heat-sealing properties to the outer packaging material 10, and is arranged at an inner side and heat sealed when an electric storage device is assembled. The sealant layer 17 is formed of a resin film made of a polyolefin resin and an acid-modified polyolefin resin wherein a polyolefin resin is graft modified with an acid such as maleic anhydride or the like. Of these, a polyolefin resin is preferred because it is able to improve the barrier properties against water vapor and to configure the shape of an electric storage device without excess crush by heat sealing. Polypropylene is more preferred.

Examples of the polyolefin resin include: low density, medium density and high density polyethylenes; ethylene-α-olefin copolymers; polypropylenes; and propylene-α-olefin copolymers. The polyolefin resin in the form of a copolymer may be either a block copolymer or a random copolymer. These polyolefin resins may be used singly or in combination of two or more.

The respective types of polypropylenes, i.e. random polypropylene, homopolypropylene and block polypropylene, may be admixed with a low crystallinity ethylene-butene copolymer, a low crystallinity propylene-butene copolymer, a terpolymer made of a copolymer of three components including ethylene, butene and propylene, an anti-blocking agent (AB agent) such as silica, zeolite, acrylic resin beads or the like, and a slip agent based on a fatty acid amide.

The acid-modified polyolefin resins are ones similar to those indicated with respect to the sealant adhesion layer 16.

The sealant layer 17 may be made of a single-layer film or a multilayer film, which is chosen depending on the function required. For instance, in order to impart moisture proofness, there can be used a multilayer film wherein resins such as an ethylene-cyclic olefin copolymer and polymethylpentene are intervened.

The sealant layer 17 may further contain various types of additives such as a flame retardant, a slip agent, an anti-blocking agent, an antioxidant, a light stabilizer, a tackifier and the like.

Where a thermal fusion bonding film formed by extrusion molding is used as the sealant layer 17, there is a tendency of orientation in the extrusion direction of the thermal fusion bonding film. Accordingly, an elastomer may be formulated in the thermal fusion bonding film from the standpoint of mitigating the anisotropy of the oriented sealant layer 17. In doing so, when the outer packaging material 10 for electric storage battery is subjected to cold molding to form a recess, the sealant layer 17 is suppressed from being whitened.

The elastomer for the sealant layer 17 includes, for example, such a material exemplified as an elastomer constituting the sealant adhesion layer 16. Where the sealant layer 17 has a multilayer film structure, it is possible to configure such that at least one layer of a plurality of layers for the multilayer film structure contains an elastomer. For example, in the case that the sealant layer 17 has a three-layer laminate structure including, as stacked, random polypropylene layer/block polypropylene layer/random polypropylene layer, the elastomer may be formulated only in the block polypropylene layer or formulated only in the random polypropylene layers, or formulated in both the random polypropylene layers and the block polypropylene layer.

In order to impart slippage to the sealant layer 17, a lubricant may be contained. When the sealant layer 17 contains a lubricant, under which a recess is formed in the outer packaging material 10 for electric storage device by cold molding, it becomes possible to avoid that portions, which correspond to the sides or corners of the recess of the outer packaging material 10 for electric storage device and suffer a high degree of stretching, are stretched more than necessary. Hence, there can be suppressed peeling between the metal foil layer 14 and the sealant adhesion layer 16 and the occurrence of breakage and whitening due to cracks in the sealant layer 17 and the sealant adhesion layer 16.

Where a lubricant is contained in the sealant layer 17, the content of the lubricant in the sealant layer 17 (100 mass %) is preferably from 0.001 mass % to 0.5 mass %. If the content of the lubricant is not less than 0.001 mass %, there is a tendency that the sealant layer 17 can be suppressed from being whitened during cold molding. If the content of the lubricant is not larger than 0.5 mass %, there is a tendency that the lowering of the adhesion strength between the surface of the sealant layer 17 and the surface of other layer in contact with the former surface can be suppressed.

The thickness of the sealant layer 17 is preferably from 10 to 100 μm, more preferably from 20 to 60 μm. When the thickness of the sealant layer 17 is not less than 20 μm, adequate heat seal strength can be obtained. If not larger than 90 μm, the amount of infiltrated moisture from the end portions of the outer packaging material can be reduced.

[Method of Preparing an Outer Packaging Material]

Next, a method of preparing an outer packaging material 10 is described. It will be noted that the method of preparing the outer packaging material 10 is not limited to the following method.

For the preparation of the outer packaging material 10, mention is made of a method having, for example, the following steps S11 to S14.

Step S11: Step of forming a corrosion inhibition treatment layer 15a on one surface of a metal foil layer 14 and forming a corrosion inhibition treatment layer 15b on the other surface of the metal foil layer 14.

Step S12: Step of forming an easy adhesion treatment 12 on one surface of a substrate layer 11 to obtain a laminate.

Step S13: Step of subjecting a surface at a side opposite to the metal foil layer 14 of the corrosion inhibition treatment layer 15a and a surface at a side of the easy adhesion treatment layer 12 of the laminate to lamination through an adhesion layer 13.

Step S14: Step of forming a sealant layer 17 via the sealant adhesion layer 16 on a surface at a side opposite to the metal foil layer 14 of the corrosion inhibition treatment layer 15b.

(Step S11)

In the step S11, the corrosion inhibition treatment layer 15a is formed on one surface of the metal foil layer 14 and the corrosion inhibition treatment layer 15b is formed on the opposite surface of the metal foil layer 14. The corrosion inhibition treatment layers 15a, 15b may be separately formed, or both may be formed at a time. More particularly, for example, a corrosion inhibition treatment agent (a matrix material for the corrosion inhibition treatment layers) is coated onto both surfaces of the metal foil layer 14, followed by drying, curing and baking successively to form the corrosion inhibition treatment layers 15a, 15b at one time. Alternatively, a corrosion inhibition treatment agent may be coated onto one surface of the metal foil layer 14, dried, cured and baked successively to form the corrosion inhibition treatment layer 15a, followed by forming the corrosion inhibition treatment layer 15b on the other surface of the metal foil layer 14. The order of formation of the corrosion inhibition treatment layers 15a and 15b is not particularly limited. Different types or the same type of corrosion inhibition treatment agent may be, respectively, used for the corrosion inhibition treatment layer 15a and the corrosion inhibition treatment layer 15b. The corrosion inhibition treatment agent used may be, for example, a corrosion inhibition treatment agent for coating-type chromate treatment. The manner of coating a corrosion inhibition treatment agent is not particularly limited, and there can be used methods including, for example, a gravure coating method, a gravure reverse coating method, a roll coating method, a reverse roll coating method, a die coating method, a bar coating method, an kiss coating method, a comma coating method and the like. It will be noted that the metal foil layer 14 used may be an untreated metal foil layer or may be a metal foil layer which has been subjected to defatting treatment such as wet type defatting treatment or dry type defatting treatment.

(Step S12)

In the step S12, an easy adhesion treatment layer 12 is formed on one surface of the substrate layer 11. An instance of a method of forming the easy adhesion treatment layer 12 is described with respect to an inline coating method. Initially, there is provided an aqueous coating solution containing a dispersion wherein the resin indicated before and serving as a main component of the easy adhesion treatment layer 12 is dispersed in a dispersing agent. This aqueous coating solution is coated onto one surface of a thermoplastic resin film (a matrix material of the substrate layer 11) prior to completion of crystalline orientation. Next, the coated aqueous coating solution is dried, followed by stretching the thermoplastic resin film at least uniaxially.

Next, the orientation of the thermoplastic resin film is completed by thermal treatment thereby obtaining a laminate wherein the easy adhesion treatment film 12 has been formed on the one surface of the substrate layer 11. The formation of the easy adhesion treatment layer 12 by use of such an inline coating method results in improved adhesion between the substrate layer 11 and the easy adhesion treatment layer 12. It is to be noted that the formation method of the easy adhesion treatment layer 12 is not limited to the above method, and any methods may be used. Additionally, the timing of forming the easy adhesion treatment layer 12 is not limited to the present embodiment.

(Step S13)

In the step S13, a surface at the side opposite to the metal foil layer 14 of the corrosion inhibition treatment layer 15a and a surface at the side of the easy adhesion treatment layer 12 of the laminate are laminated according to a technique, such as dry lamination, using an adhesive formed of the adhesion layer 13. To facilitate the adhesion in the step S13, aging (aging) treatment may be performed within a range of room temperature to 100° C. The aging time is, for example, 1 to 10 days.

(Step S14)

After the step S13, a sealant layer 17 is formed via the sealant adhesion layer 16 on a surface at the side opposite to the metal foil layer 14 of the corrosion inhibition treatment layer 15b of the laminate. The laminate has the substrate layer 11, the easy adhesion treatment layer 12, the adhesion layer 13, the corrosion inhibition treatment layer 15a, the metal foil layer 14 and the corrosion inhibition treatment layer 15b laminated in this order. The sealant layer 17 may be stacked by dry lamination, sandwich lamination or the like, or may be stacked by a co-extrusion technique along with the sealant adhesion layer 16. It is preferred from the standpoint of improved adhesion that the sealant layer 17 is laminated, for example, by sandwich lamination, or by a co-extrusion method along with the sealant adhesion layer 16, of which the lamination by sandwich lamination is more preferred.

According to the steps S11 to S14 set out above, the outer packaging material 10 is obtained. It will be noted that the order of the steps of the method of forming the outer packaging material 10 is not limited to the method wherein the above steps S11 to S14 are successively carried out. For example, the order of the steps to be carried out may be appropriately changed in a manner as to initially carry out the step S12, followed by the step S11.

[Electric Storage Device]

Next, an electric storage device provided with the outer packaging material 10 as a container is illustrated. The electric storage device comprises a battery element 1 including electrodes, leads 2 extending from the respective electrodes, and a container accommodating the battery element 1, the container is formed from the outer packaging material 10 for electric storage device in such a way that the sealant layer 17 is at an inner side thereof. The container may be obtained by superposing two outer packaging materials so that the sealant layers 17 are mutually facing each other and subjecting to thermal fusion bonding along the periphery of the superposed outer packaging materials 10, or may be obtained in such a way that one outer packaging material is doubled up, followed by similarly thermal fusion bonding of the periphery of the outer packaging material 10. The electric storage device may be provided with an outer packaging material 10 as a container. As an electric storage device, mention is made, for example, of secondary batteries such as lithium ion batteries, nickel hydrogen batteries and lead storage batteries, and electrochemical capacitors such as electric double layer capacitor and the like.

The lead 2 is sandwiched between the outer packaging materials 10 forming the container that has the sealant layer 17 arranged at an inner side and hermetically sealed. The lead 2 may be sandwiched via a tab sealant between the outer packaging materials 10.

[Method of Fabricating an Electric Storage Device]

Next, a method of fabricating an electric storage device using such an outer packaging material 10 is described. It will be noted that the case that a secondary battery 40 is fabricated using an embossed outer packaging material 30 is illustrated by way of example. FIG. 2 is a view showing an embossed outer packaging material 30. (a) to (d) of FIG. 3 are, respectively, a perspective view showing the steps of fabricating a one-side molded battery using the outer packaging material 10. The secondary battery 40 may be a two-side molded battery wherein two outer packaging materials such as the embossed outer packaging materials 30 are provided and laminated while adjusting the mutual alignment of the two outer packaging materials. The embossed outer packaging material 30 may be formed by use of the outer packaging material 10.

The secondary battery 40 in the form of the one-side molded battery can be fabricated, for example, according to the following steps S21 to S25.

Step S21: Step of providing an outer packaging material 10, a battery element 1 including electrodes, and leads 2 extending from the respective electrodes.

Step S22: Step of forming a recess 32 arranging the battery element 1 on one surface of the outer packaging material 10 (see FIGS. 3(a) and 3(b)).

Step S23: Step of placing the battery element 1 in a formed area (recess 32) of an embossed outer packaging material 30, doubling up the embossed outer packaging material 30 so as to cover the recess 32 with a cover portion 34 and thermally fusion bonding one side of the embossed outer packaging material 30 in such a way that the leads 2 extending from the battery element 1 are sandwiched (FIGS. 3(b) and 3(c)).

Step S24: Step of, after leaving one side other than the side where the leads 2 have been sandwiched, subjecting the other sides to pressure thermal-fusion bonding, charging an electrolytic solution from the remaining side, and subjecting the remaining one side to pressure thermal-fusion bonding in vacuum (see FIG. 3(c)).

Step S25: Step of cutting the pressure thermal-fusion bonded peripheral portions other than the side at which the leads 2 have been sandwiched, and folded back toward the formed area (recess 32) (see FIG. 3(d)).

(Step S21)

In the step S21, there are provided the outer packaging material 10, the battery element 1 including electrodes, and leads 2 extending from the respective electrodes. The outer packaging material 10 is provided based on the foregoing embodiments. The battery element 1 and the leads 2 are not specifically limited and a known battery element 1 and leads 2 can be used.

(Step S22)

In the step S22, the recess 32 is formed at the side of the sealant layer 17 of the outer packaging material 10 so as to place the battery element 1 therein. The planar shape of the recess 32 is one corresponding to the shape of the battery element 1, e.g. a rectangle in planar view. The recess 32 is formed by pushing a press member having, for example, a rectangular press face against part of the outer packaging material 10 along the direction of thickness. The pressed position, i.e. the recess 32, is formed at a position biased from the center of a rectangularly cut sheet of the outer packaging material 10 toward one end of the outer packaging material 10 along the lengthwise direction. This allows the other end portion side, not formed with the recess 32, to be folded back thereby providing a cover (cover portion 34).

Figure 2A:
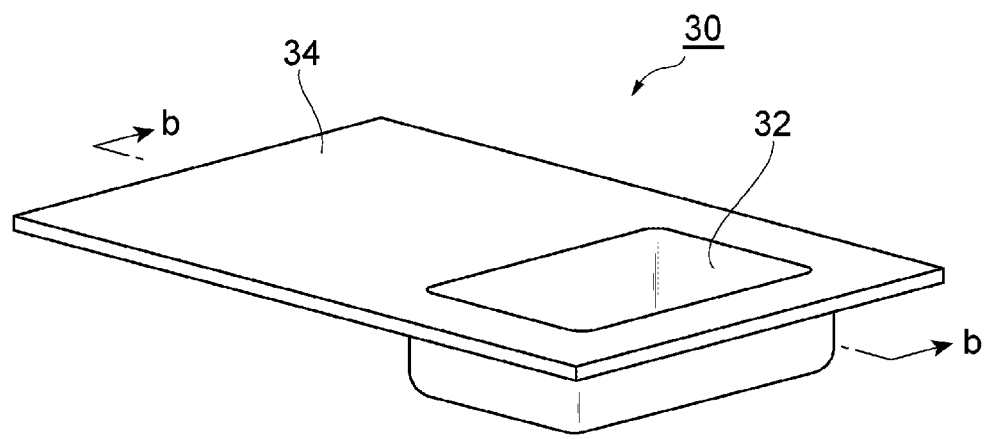
Figure 2B:
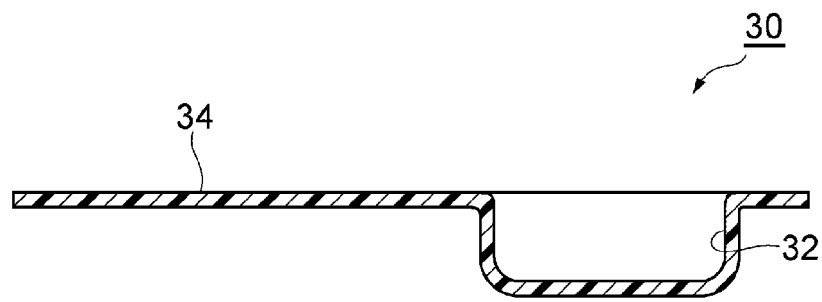
Figure 3A:
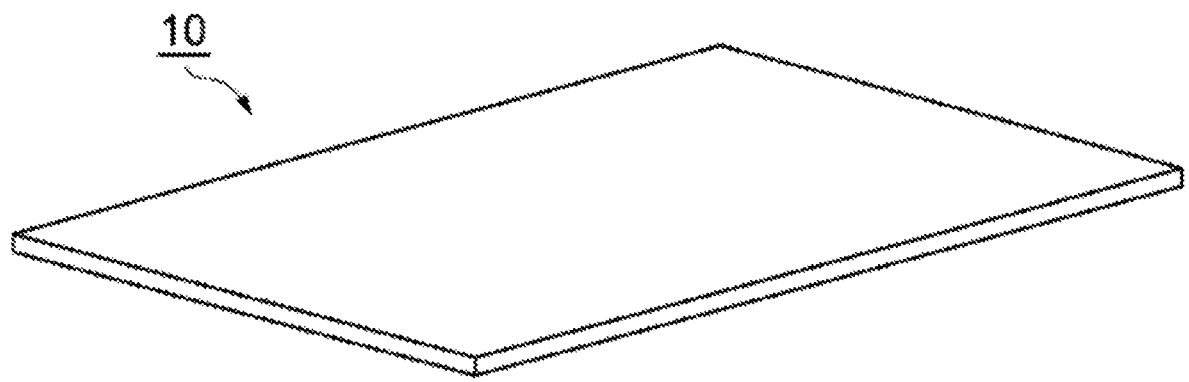
Figure 3B:
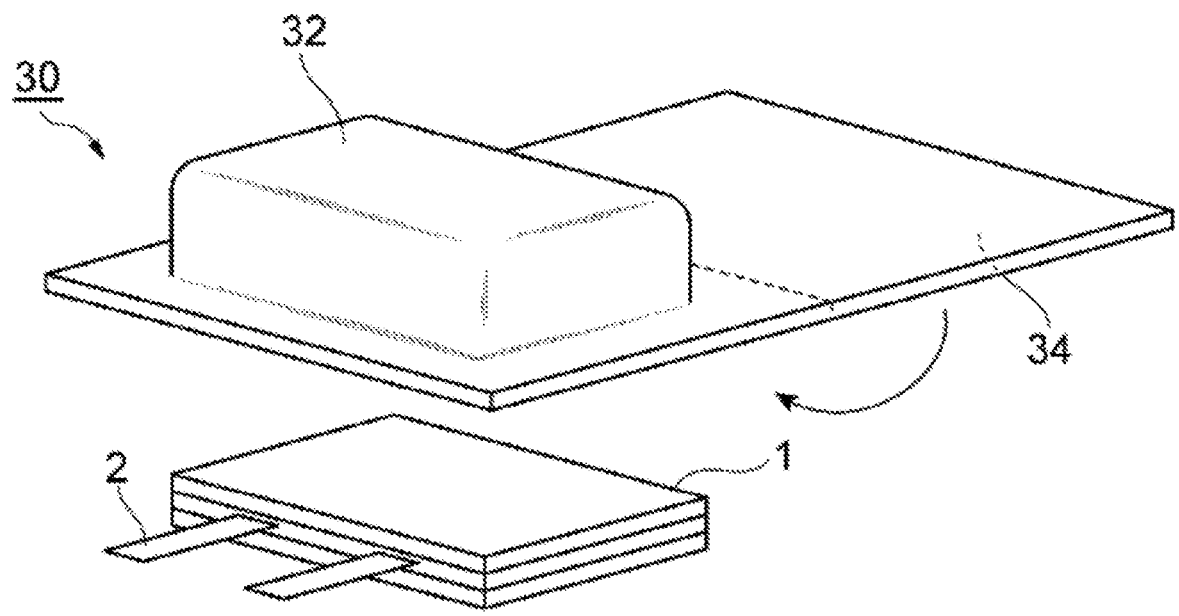
Figure 3C:
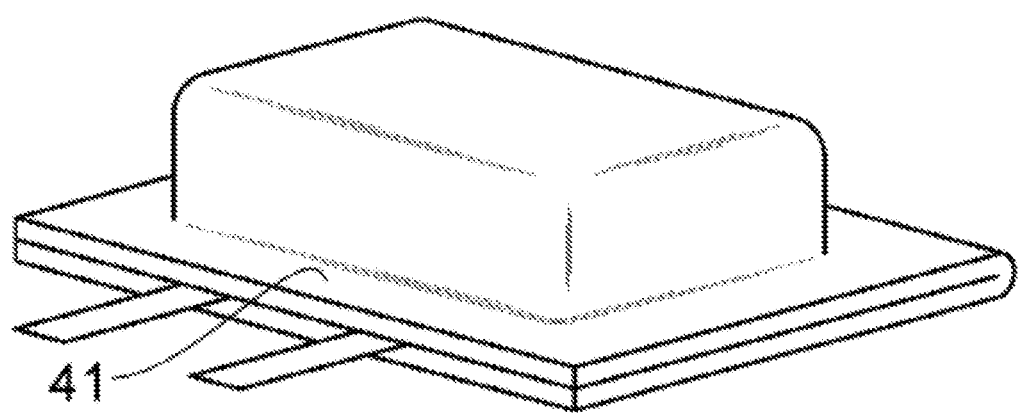
Figure 3D:
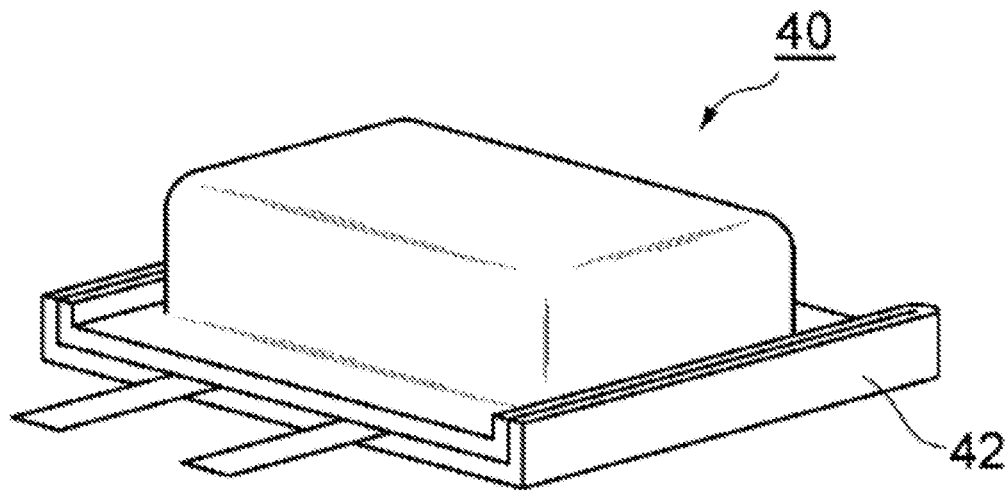

A more specific method of forming the recess 32 includes forming (deep drawing forming) using a mold. The forming method is one wherein female and male molds are used wherein they are so set as to have a gap not less than the thickness of the outer packaging material 10, and the male mold is pushed into the female mold along with the outer packaging material 10. The adjustment of the pushing depth enables the depth of the recess 32 (deep drawn depth) to be adjusted to a desired level. The formation of the recess 32 in the outer packaging material 10 results in the embossed outer packaging material 30. This embossed outer packaging material 30 has, for example, such a shape as shown in FIG. 2. Here, FIG. 2(a) is a perspective view of the embossed outer packaging material 30, and FIG. 2(b) is a longitudinal sectional view taken along the line b-b of the embossed outer packaging material 30 shown in FIG. 2(a).

(Step S23)

In the step S23, the battery element 1 constituted of a positive electrode, a separator, a negative electrode and the like is placed in the formed area (recess 32) of the embossed outer packaging material 30. The leads 2, which extend from the battery element 1 and are, respectively, connected to the positive electrode and the negative electrode, are taken out outside the formed area (recess 32). Thereafter, the embossed outer packaging material 30 is folded back substantially at the center along the length thereof and is overlaid so that the sealant layers 17 are facing each other, followed by subjecting, to the pressure thermal-fusion bonding, the side of the embossed outer packaging material 30 at which the leads 2 have been sandwiched. The pressure thermal-fusion bonding is controlled under the three conditions of temperature, pressure and time, which are appropriately set. The temperature of the pressure thermal-fusion bonding is preferably at a level not lower than a melting temperature of the sealant layer 17.

It will be noted that the thickness of the sealant layer 17 prior to the thermal-fusion bonding is preferably from 40% to 80% of the thickness of the lead 2. When the thickness of the sealant layer 17 is not less than the above lower limit, there is a tendency that the end portion of the lead 2 can be satisfactorily sealed with the thermally fusion resin. If not larger than the above upper limit, the thickness of the end portion of the outer packaging material 10 of the secondary battery 40 can be appropriately suppressed thereby enabling the infiltration amount of moisture from the end portion of the outer packaging material 10 to be reduced.

(Step S24)

In the step S24, one side other than the side sandwiching the leads 2 is left and the other sides are subjected to thermal-fusion bonding under pressure. An electrolytic solution is charged from the remaining one side and is subsequently subjected to thermal-fusion bonding under pressure in vacuum. The conditions of the pressure thermal-fusion bonding are the same as in the step S23.

(Step S25)

The peripheral pressure thermal-fusion bonded portions other than that of the side sandwiching the leads 2 are cut so as to remove the sealant layers 17 protruding from the end portions. Thereafter, the peripheral pressure thermal-fusion bonded portions are folded back toward the formed area 32 to form folded-back portions 42 thereby obtaining the secondary battery 40.

As stated above, the preferred embodiments of the outer packaging material for electric storage device and the method for fabricating an electric storage device according to the invention are described in detail. The present invention should not be construed as limited to such specific embodiments and many variations and alterations may be possible within the spirit of the invention set forth in the claims.

EXAMPLES

The present invention is more particularly described by way of examples, which should not be construed as limiting the invention thereto.

(Provision of Substrate Layer)

As a substrate 11, there were provided the following nylon films A-1-1 to A-1-2, B-1-1 to B-1-7, C-1-1 to C-1-3 and D-1-1 to D-1-2, each prepared according to a tubular, biaxially stretching process. The thickness, the hot water shrinkage rate at 95° C. and the hot shrinkage rate at 180° C. of the respective nylon films are indicated below.

A-1-1: thickness of 15 μm, hot water shrinkage rate at 95° C. of 3.6%, hot shrinkage rate at 180° C. of 5.3%

A-1-2: thickness of 15 μm, hot water shrinkage rate at 95° C. of 2.8%, hot shrinkage rate at 180° C. of 3.0%

B-1-1: thickness of 25 μm, hot water shrinkage rate at 95° C. of 4.0%, hot shrinkage rate at 180° C. of 4.8%

B-1-2: thickness of 25 μm, hot water shrinkage rate at 95° C. of 4.0%, hot shrinkage rate at 180° C. of 4.8%

B-1-3: thickness of 25 μm, hot water shrinkage rate at 95° C. of 3.6%, hot shrinkage rate at 180° C. of 9.4%

B-1-4: thickness of 25 μm, hot water shrinkage rate at 95° C. of 3.7%, hot shrinkage rate at 180° C. of 15.2%

B-1-5: thickness of 25 μm, hot water shrinkage rate at 95° C. of 2.6%, hot shrinkage rate at 180° C. of 2.7%

B-1-6: thickness of 25 μm, hot water shrinkage rate at 95° C. of 7.7%, hot shrinkage rate at 180° C. of 15.1%

B-1-7: thickness of 25 μm, hot water shrinkage rate at 95° C. of 4.8%, hot shrinkage rate at 180° C. of 20.4%

C-1-1: thickness of 25 μm, hot water shrinkage rate at 95° C. of 4.0%, hot shrinkage rate at 180° C. of 4.8%

C-1-2: thickness of 25 μm, hot water shrinkage rate at 95° C. of 3.6%, hot shrinkage rate at 180° C. of 9.4%

C-1-3: thickness of 25 μm, hot water shrinkage rate at 95° C. of 3.7%, hot shrinkage rate at 180° C. of 15.2%

D-1-1: thickness of 25 μm, hot water shrinkage rate at 95° C. of 3.7%, hot shrinkage rate at 180° C. of 4.5%

D-1-2: thickness of 25 μm, hot water shrinkage rate at 95° C. of 2.4%, hot shrinkage rate at 180° C. of 2.8%

(Preparation of a Coating Agent for Forming an Easy Adhesion Treatment Layer)

A coating agent for forming an easy adhesion treatment layer was prepared as having the following formulation.

Coating agent: A self-emulsifying polyisocyanate "Aquanate 100", manufactured by Nippon Polyurethane Industry Co., Ltd., and spherical silica fine particles "Seahostar KE-P30" (average particle size of 0.3 μm), manufactured by Nippon Shokubai Co., Ltd., were added to a water-soluble polyester "Aron Melt PES-1000", manufactured by Toagosei Co., Ltd., at formulation ratios (mass ratios) of 95/5/0.5 and diluted with water.

Example 1-1

In Example 1-1, an outer packaging material 10 for electric storage device was fabricated according to following procedure. Initially, a 40 μm thick, soft aluminum foil 8079 material (manufactured by Toyo Aluminium K. K.) was provided as a metal foil layer 14. Next, a sodium polyphosphate-stabilized cerium oxide sol (corrosion inhibition treatment agent) using distilled water as a solvent and having a solid concentration adjusted to 10 mass % was coated onto both surfaces of the metal foil layer 14 by gravure coating. On this occasion, 10 parts by mass of the phosphoric acid was used per 100 parts by mass of cerium oxide.

Next, the thus coated sodium polyphosphate-stabilized cerium oxide sol was dried and successively baked to form a corrosion inhibition treatment layer 15a on one surface of the metal foil treatment 14 and a corrosion inhibition treatment layer 15b on the other surface. The baking conditions included a temperature of 150° C. and a treating time of 30 seconds.

Next, nylon film A-1-1 was used as a substrate layer 11, followed by corona treatment on one surface of the substrate layer 11.

Next, a polyurethane adhesive used for an adhesion layer 13 was coated onto a surface of the corrosion inhibition treatment layer 15a of the metal foil layer 14 at the side opposite to the metal foil layer 14. Subsequently, the metal foil layer 14 and the corona treated surface of the substrate layer 11 were bonded via the adhesion layer 13 by a dry lamination process. Thereafter, the structure composed of the substrate layer 11, the adhesion layer 13, the corrosion inhibition treatment 15a, the metal foil layer 14, and the corrosion inhibition treatment layer 15b was allowed to stand in a temperature atmosphere of 60° C. for 6 days for aging treatment.

Next, a polyurethane adhesive, in which a polyisocyanate was formulated in an acid-modified polyolefin dissolved in a mixed solvent of toluene and methylcyclohexane for use as a sealant adhesion layer 16, was coated onto a surface of the corrosion inhibition treatment layer 15b at a side opposite to the metal foil layer 14. Next, a 40 μm thick polyolefin film (a film corona treated on the surface thereof at a side of the sealant adhesion layer 16 of an unstretched polypropylene film) serving as the sealant layer 17 and the metal foil layer 14 were bonded through the sealant adhesion layer 16 by a dry lamination process. Thereafter, the structure composed of the substrate layer 11, the adhesion layer 13, the corrosion inhibition treatment layer 15a, the metal foil layer 14, the corrosion inhibition treatment layer 15b, the sealant adhesion layer 16 and the sealant layer 17 were allowed to stand in a temperature atmosphere of 40° C. for 6 days for aging treatment. In this way, an outer packaging material 10 for electric storage device was fabricated.

In Comparative Example 1-1, an outer packaging material 10 for electric storage device was fabricated in the same manner as in Example 1-1 except that the substrate layer 11 was changed to nylon film A-1-2.

<Evaluation of Formed Depth>

As to the outer packaging materials 10 for electric storage device fabricated in Example 1-1 and Comparative Example 1-1, the formed depth enabling deep drawing forming was evaluated according to the following method. Initially, the outer packaging material 10 for electric storage device was placed in a molding device so that the sealant layer 17 was arranged to face upward. The forming depth of the molding device was set within 5.0 to 7.5 mm in every 0.5 mm and cold forming was performed under an environment of room temperature of 23° C. and a dew-point temperature of −35° C. It will be noted that a punch mold used was one that had a cross section of a rectangle with a size of 70 mm×80 mm, a radius of punch (RP) of 1.00 mm at the bottom face thereof and a radius corner of punch (RCP) of 1.00 mm at the side face. The die mold used was one that had a radius of die (RD) of 1.00 mm at the upper face of an opening. The presence or absence of breakage and pinholes at the portion subjected to the cold forming was visually confirmed while irradiating light on the outer packaging material 10, and a maximum value of a formed depth permitting the deep drawing forming to be performed without causing any of the breakage and pinholes. The results are shown in Table 1.

<Evaluation of Adhesion>

The outer packaging materials 10 for electric storage device fabricated in Example 1-1 and Comparative Example 1-1 were evaluated by the following method with respect to the adhesion between the substrate layer 11 and the metal foil layer 14. Initially, the outer packaging material 10 for electric storage device was placed in the molding device so that the sealant layer 17 was arranged to face upward. The forming depth of the molding device was set at 5 mm and cold forming was performed under an environment of room temperature of 23° C. and a dew-point temperature of −35° C. It will be noted that a punch mold used was one that had a cross section of a rectangle with a size of 70 mm×80 mm, a radius of punch (RP) of 1.00 mm at the bottom face thereof and a radius corner of punch (RCP) of 1.00 mm at the side face. The die mold used was one that had a radius of die (RD) of 1.00 mm at the upper face of an opening.

Next, the cold formed outer packaging material 10 was placed in a 100 ml beaker, in which 30 ml of a 1M lithium phosphate hexafluoride (ratios by volumes of solvents=ethyl carbonate:dimethyl carbonate:dimethyl carbonate=1:1:1) was placed. Thereafter, the beaker in which the outer packaging material had been placed was sealed in an 18-liter square can and placed in a temperature environment of 40° C. for 2 hours, thereby exposing the outer packaging material 10 to the electrolytic solution. Subsequently, the outer packaging material 10 was taken out from the 18-liter square can and placed in an environment of a temperature of 60° C. and a humidity of 95% in an oven of 110° C., or in hot water of 50° C. One week, two weeks, three weeks and four weeks after the placement, the presence or absence of peeling between the substrate layer 11 and the metal foil layer 14 of the outer packaging material 10 was visually confirmed to determine a maximum period (unit: week), over which no peeling between the substrate layer 11 and the metal foil layer 14 was confirmed. Based on the results, the adhesion between the substrate layer 11 and the metal foil layer 14 was evaluated according to the following evaluation standards. The results are shown in Table 1.

A: No peeling was confirmed even after 4 weeks.
B: Although no peeling was confirmed after 3 weeks, peeling occurred after 4 weeks.
C: Although no peeling was confirmed after 2 weeks, peeling occurred after 3 weeks.
D: Although no peeling was confirmed after 1 week, peeling occurred after 2 weeks.
E: Peeling occurred after 1 week.

TABLE 1

|  | Substrate layer | | | | | Adhesion | | |
| --- | --- | --- | --- | --- | --- | --- | --- | --- |
| Name of substrate | 95° C. Hot water shrinkage rate (%) | 180° C. Hot shrinkage rate (%) | Metal foil layer surface treatment | Formed depth (mm) | | 110° C. | 60° C., 95% | Hot water 50° C. |
| Example 1-1 | A-1-1 | 3.6 | 5.3 | Cerium oxide | 5.0 | A | A | A |
| Comparative Example 1-1 | A-1-2 | 2.8 | 3.0 | Cesium oxide | 4.5 | A | A | A |

As will be apparent from the results shown in Table 1 and relating to the outer packaging materials using the substrate layer 11 whose thickness is set at 15 μm, it has been confirmed that the outer packaging material of Example 1-1 making use of the polyamide film as the substrate layer 11 having a hot water shrinkage rate of less than 5% at 95° C. and a hot shrinkage rate of 4 to 16% at 180° C. can be improved in the deep drawing forming while maintaining the adhesion when compared with the outer packaging material of Comparative Example 1-1 making use of the polyamide film wherein the hot shrinkage rate at 180° C. does not satisfy the above requirement.

Example 1-2

In Example 1-2, an outer packaging material 10 for electric storage device was fabricated in the same manner as in Example 1-1 except that instead of forming the corrosion inhibition treatment layers 15a, 15b using a sodium polyphosphate-stabilized cesium oxide sol, a treating solution made of a phenolic resin, a chromium fluoride compound and phosphoric acid was coated on both surfaces of the metal foil layer 14 to form the respective films, followed by chromate treatment by baking to form corrosion inhibition treatment layers 15a, 15b and that the substrate layer 11 was changed to nylon film B-1-1.

Example 1-3

In Example 1-3, an outer packaging material 10 for electric storage device was fabricated in the same manner as in Example 1-1 except that the substrate layer 11 was changed to nylon B-1-2.

Example 1-4

In Example 1-4, an outer packaging material 10 for electric storage device was fabricated in the same manner as in Example 1-1 except that the substrate layer 11 was changed to nylon B-1-3.

Example 1-5

In Example 1-5, an outer packaging material 10 for electric storage device was fabricated in the same manner as in Example 1-1 except that the substrate layer 11 was changed to nylon B-1-4.

Comparative Example 1-2

In Comparative Example 1-2, an outer packaging material 10 for electric storage device was fabricated in the same manner as in Example 1-1 except that the substrate layer 11 was changed to nylon B-1-5.

Comparative Example 1-3

In Comparative Example 1-3, an outer packaging material 10 for electric storage device was fabricated in the same manner as in Example 1-1 except that the substrate layer 11 was changed to nylon B-1-6.

Comparative Example 1-4

In Comparative Example 1-4, an outer packaging material 10 for electric storage device was fabricated in the same manner as in Example 1-1 except that the substrate layer 11 was changed to nylon B-1-7.

<Evaluation of Formed Depth>

As to the outer packaging materials 10 fabricated in Examples 1-2 to 1-5 and Comparative Examples 1-2 to 1-4, the formed depth enabling deep drawing forming was evaluated according to the same test method as described in Example 1-1. The results are shown in Table 2.

<Evaluation of Adhesion>

As to the outer packaging materials 10 fabricated in Examples 1-2 to 1-5 and Comparative Examples 1-2 to 1-4, the adhesion between the substrate layer 11 and the metal foil layer 14 was evaluated according to the same test method as described in Example 1-1. The results are shown in Table 2.

polyolefin film (a film corona treated on the surface of an unstretched polypropylene film at a side of the sealant adhesion layer 16) serving as the sealant layer 17 was bonded (thermal pressure bonded) to the corrosion inhibition treatment layer 15b through the sealant adhesion layer 16 at 180° C. In Example 1-6, an outer packaging material 10 for electric storage device was fabricated in the same manner as in Example 1-1 except for the above changes.

TABLE 2

| | Substrate layer | | | Metal foil layer | Formed | Adhesion | | |
|---|---|---|---|---|---|---|---|---|
| | Name of substrate | 95° C. Hot water shrinkage rate (%) | 180° C. Hot shrinkage rate (%) | surface treatment | depth (mm) | 110° C. | 60° C., 95% | Hot water 50° C. |
| Example 1-2 | B-1-1 | 4.0 | 4.8 | Chromate | 6.5 | A | A | C |
| Example 1-3 | B-1-2 | 4.0 | 4.8 | Cerium oxide | 6.5 | A | A | A |
| Example 1-4 | B-1-3 | 3.6 | 9.4 | Cerium oxide | 6.5 | A | A | A |
| Example 1-5 | B-1-4 | 3.7 | 15.2 | Cerium oxide | 6.5 | A | A | A |
| Comparative Example 1-2 | B-1-5 | 2.6 | 2.7 | Cesium oxide | 5.5 | A | A | A |
| Comparative Example 1-3 | B-1-6 | 7.7 | 15.1 | Cesium oxide | 6.5 | E | E | E |
| Comparative Example 1-4 | B-1-7 | 4.8 | 20.4 | Cesium oxide | 6.5 | A | E | E |

As will be apparent from the results shown in Table 2 and relating to the outer packaging materials using the substrate layer 11 whose thickness is set at 25 μm, it has been confirmed that the outer packaging materials of Examples 1-2 to 1-5 making use of the polyamide films as the substrate layer 11 having a hot water shrinkage rate of less than 5% at 95° C. and a hot shrinkage rate of 4 to 16% at 180° C. can be improved in the deep drawing forming while maintaining the adhesion when compared with the outer packaging materials of Comparative Examples 1-2 to 1-4 making use of the polyamide films wherein at least one of the hot water shrinkage rate at 95° C. and the hot shrinkage rate at 180° C. does not satisfy the above requirement.

Example 1-6

In Example 1-6, the following changes to Example 1-1 were made. In Example 1-6, the substrate 11 was changed to nylon film C-1-1. The sealant adhesion layer 16 was formed by extruding maleic anhydride-modified polypropylene (commercial name: Admer, manufactured by Mitsui Chemicals Inc.) serving as a matrix material of the sealant adhesion layer 16. On this occasion, the thickness of the sealant adhesion layer 16 was set at 20 μm. Moreover, a 60 μm thick Example 1-7

In Example 1-7, an outer packaging material 10 for electric storage device was fabricated in the same manner as in Example 1-6 except that the substrate layer 11 was changed to nylon film C-1-2.

Example 1-8

In Example 1-8, an outer packaging material 10 for electric storage device was fabricated in the same manner as in Example 1-6 except that the substrate layer 11 was changed to nylon film C-1-3.

<Evaluation of Molded Depth>

As to the outer packaging materials 10 fabricated in Examples 1-6 to 1-8, the formed depth enabling deep drawing forming was evaluated according to the same test method as described in Example 1-1. The results are shown in Table 3.

<Evaluation of Adhesion>

As to the outer packaging materials 10 fabricated in Examples 1-6 to 1-8, the adhesion between the substrate layer 11 and the metal foil layer 14 was evaluated according to the same test method as described in Example 1-1. The results are shown in Table 3.

TABLE 3

| | Substrate layer | | | Metal foil layer | Formed | Adhesion | | |
|---|---|---|---|---|---|---|---|---|
| | Name of substrate | 95° C. Hot water shrinkage rate (%) | 180° C. Hot shrinkage rate (%) | surface treatment | depth (mm) | 110° C. | 60° C., 95% | Hot water 50° C. |
| Example 1-6 | C-1-1 | 4.0 | 4.8 | Cerium oxide | 6.5 | A | A | A |
| Example 1-7 | C-1-2 | 3.6 | 9.4 | Cerium oxide | 6.5 | A | A | A |
| Example 1-8 | C-1-3 | 3.7 | 15.2 | Cerium oxide | 6.5 | A | A | A |

As will be apparent from the results shown in Table 3 and relating to the outer packaging materials using the substrate layer 11 whose thickness is set at 25 μm, it has been confirmed that the outer packaging materials of Examples 1-6 to 1-8 making use of the polyamide films as the substrate layer 11 having a hot water shrinkage rate of less than 5% at 95° C. and a hot shrinkage rate of 4 to 16% at 180° C. can be improved in the deep drawing molding while maintaining the adhesion even though the sealant adhesion layer 16 is provided by the sandwich lamination process.

Example 1-9

In Example 1-9, an outer packaging material 10 for electric storage device was fabricated in the same manner as in Example 1-1 except that an easy adhesion treatment layer 12 was formed on the surface of the substrate 11 at the side of the adhesion layer 13 instead of corona treatment on one surface of the substrate layer 11 and that the substrate layer 11 was changed to nylon film D-1-1. The easy adhesion treatment layer 12 was formed by coating a coating agent serving as a matrix material of the easy adhesion treatment layer 12 and having a solid content of 0.1 g/m² on one surface of the substrate layer 11 and dried thereby forming an about 0.1 μm thick easy adhesion treatment layer 12.

Comparative Example 1-6

In Comparative Example 1-6, an outer packaging material 10 for electric storage device was fabricated in the same manner as in Example 1-9 except that the substrate layer 11 was changed to nylon film D-1-2.

<Evaluation of Formed Depth>

As to the outer packaging materials 10 fabricated in Examples 1-9 and Comparative Example 1-6, the formed depth enabling deep drawing forming was evaluated according to the same test method as described in Example 1-1. The results are shown in Table 4.

<Evaluation of Adhesion>

As to the outer packaging materials 10 fabricated in Examples 1-9 and Comparative Example 1-6, the adhesion between the substrate layer 11 and the metal foil layer 14 was evaluated according to the same test method as described in Example 1-1. The results are shown in Table 4.

maintaining the adhesion when compared with the outer packaging material of Comparative Example 1-6 making use of the polyamide film wherein the hot shrinkage rate at 180° C. does not satisfy the above requirement.

[Provision of Substrate Layers]

As a substrate layer 11, there were provided the following polyethylene terephthalate films A-2-1 to A-2-2, B-2-1 to B-2-7 and C-2-1 to C-2-2, each prepared by a simultaneous, biaxially stretching method. The thickness, the hot water shrinkage rate at 95° C. and the hot shrinkage rate at 180° C. of the respective polyethylene terephthalate films are indicated below.

A-2-1: thickness of 12 μm, hot water shrinkage rate at 95° C. of 3.5%, and hot shrinkage rate at 180° C. of 18.7%

A-2-2: thickness of 12 μm, hot water shrinkage rate at 95° C. of 2.5%, hot shrinkage rate at 180° C. of 6.0%

B-2-1: thickness of 25 μm, hot water shrinkage rate at 95° C. of 2.5%, hot shrinkage rate at 180° C. of 19.9%

B-2-2: thickness of 25 μm, hot water shrinkage rate at 95° C. of 2.8%, hot shrinkage rate at 180° C. of 19.9%

B-2-3: thickness of 25 μm, hot water shrinkage rate at 95° C. of 3.3%, hot shrinkage rate at 180° C. of 23.8%

B-2-4: thickness of 25 μm, hot water shrinkage rate at 95° C. of 2.4%, hot shrinkage rate at 180° C. of 11.2%

B-2-5: thickness of 25 μm, hot water shrinkage rate at 95° C. of 2.6%, hot shrinkage rate at 180° C. of 5.7%

B-2-6: thickness of 25 μm, hot water shrinkage rate at 95° C. of 8.5%, hot shrinkage rate at 180° C. of 19.0%

B-2-7: thickness of 25 μm, hot water shrinkage rate at 95° C. of 6.0%, hot shrinkage rate at 180° C. of 19.9%

C-2-1: thickness of 25 μm, hot water shrinkage rate at 95° C. of 2.6%, hot shrinkage rate at 180° C. of 18.4%

C-2-2: thickness of 25 μm, hot water shrinkage rate at 95° C. of 3.1%, hot shrinkage rate at 180° C. of 6.6%

(Preparation of a coating agent for forming an easy adhesion treatment layer)

A coating agent having the following formulation was prepared as a coating agent for forming an easy adhesion treatment layer.

Coating agent: A self-emulsifying polyisocyanate "Aquanate 100", manufactured by Nippon Polyurethane Industry Co., Ltd., and spherical silica fine particles "Seahostar KE-P30" (average particle size of 0.3 μm), manufactured by

TABLE 4

| | Substrate layer | | | | Adhesion | | |
|---|---|---|---|---|---|---|---|
| Name of substrate | 95° C. Hot water shrinkage rate (%) | 180° C. Hot shrinkage rate (%) | Metal foil layer surface treatment | Formed depth (mm) | 110° C. | 60° C., 95% | Hot water 50° C. |
| Example 1-9 | D-1-1 | 3.7 | 4.5 | Cerium oxide | 7.5 | A | A | A |
| Comparative Example 1-6 | D-1-2 | 2.4 | 2.8 | Cerium oxide | 6.5 | A | A | A |

As will be apparent from the results shown in Table 4 and relating to the outer packaging materials using the substrate layer 11 whose thickness is set at 25 μm and which is provided with the easy adhesion treatment layer 12, it has been confirmed that the outer packaging material of Example 1-9 making use of the polyamide films as the substrate layer 11 having a hot water shrinkage rate of less than 5% at 95° C. and a hot shrinkage rate of 4 to 16% at 180° C. can be improved in the deep drawing molding while Nippon Shokubai Co., Ltd., were added to a water-soluble polyester "Aron Melt PES-1000", manufactured by Toagosei Co., Ltd., at formulation ratios (mass ratios) of 95/5/0.5 and diluted with water.

Example 2-1

In Example 2-1, an outer packaging material 10 for electric storage device was fabricated according to following procedure. Initially, a 40 μm thick, soft aluminum foil 8079 material (manufactured by Toyo Aluminium K. K.) was provided as a metal foil layer 14. Next, a sodium polyphosphate-stabilized cerium oxide sol (corrosion inhibition treatment agent) making use of distilled water as a solvent and having a solid concentration adjusted to 10 mass % was coated onto both surfaces of the metal foil layer 14 by gravure coating. At this time, 10 parts by mass of the phosphoric acid was used per 100 parts by mass of cerium oxide.

Next, the thus coated sodium polyphosphate-stabilized cerium oxide sol was dried and subsequently baked to form a corrosion inhibition treatment layer 15a on one surface of the metal foil treatment 14 and a corrosion inhibition treatment layer 15b on the other surface. The baking conditions included a temperature of 150° C. and a treating time of 30 seconds.

Next, polyethylene terephthalate film A-2-1 was used as a substrate layer 11, followed by corona treatment on one surface of the substrate layer 11.

Next, a polyurethane adhesive used as an adhesion layer 13 was coated onto the surface of the corrosion inhibition treatment layer 15a of the metal foil layer 14 at a side opposite to the metal foil layer 14. Subsequently, the metal foil layer 14 and the corona treated surface of the substrate layer 11 were bonded via the adhesion layer 13 by a dry lamination process. Thereafter, the structure composed of the substrate layer 11, the adhesion layer 13, the corrosion inhibition treatment 15a, the metal foil layer 14, and the corrosion inhibition treatment layer 15b was allowed to stand in a temperature atmosphere of 60° C. for 6 days for aging treatment.

Next, a sealant adhesion layer 16 was formed on the surface of the corrosion inhibition treatment layer 15b at a side opposite to the metal foil layer 14. The sealant adhesion layer 16 was formed by extruding maleic anhydride-modified polypropylene (commercial name: Admer, manufactured by Mitsui Chemicals Inc.) serving as a matrix material of the sealant adhesion layer 16. The thickness of the sealant layer 16 was set at 20 μm. Next, a 60 μm thick polyolefin film (a film corona treated on the surface of an unstretched polypropylene film at the side of the sealant adhesion layer 16) serving as the sealant layer 17 was bonded (thermal pressure bonded) at 180° C. to the corrosion inhibition treatment layer 15b via the sealant adhesion layer 16 by a sandwich lamination process. In this way, an outer packaging material 10 for electric storage device was fabricated.

Comparative Example 2-1

In Comparative Example 2-1, an outer packaging material 10 for electric storage device was fabricated in the same manner as in Example 2-1 except that the substrate layer 11 was changed to polyethylene terephthalate film A-2-2.

<Evaluation of Formed Depth>

As to the outer packaging materials 10 for electric storage device fabricated in Example 2-1 and Comparative Example 2-1, the formed depth enabling deep drawing forming was evaluated according to the following method. Initially, the outer packaging material 10 for electric storage device was placed in a molding device so that the sealant layer 17 was arranged facing upward. The molding depth of the molding device was set within 4.5 to 7.5 mm in every 0.5 mm and cold forming was performed under an environment of room temperature of 23° C. and a dew-point temperature of −35° C. It will be noted that a punch mold used was one that had a cross section of a rectangle with a size of 70 mm×80 mm, a radius of punch (RP) of 1.00 mm at the bottom face thereof and a radius corner of punch (RCP) of 1.00 mm at the side face. The die mold used was one that had a radius of die (RD) of 1.00 mm at the upper face of an opening. The presence or absence of breakage and pinholes at the portion having subjected to the cold forming was visually confirmed while irradiating light on the outer packaging material 10 to determine a maximum value of a formed depth permitting the deep drawing forming to be performed without causing any of the breakage and pinholes. The results are shown in Table 5. In the table, "<4.5" means that at least one of the breakage and pinholes occurred at a formed depth of 4.5 mm.

<Evaluation of Adhesion>

The outer packaging materials 10 for electric storage device fabricated in Example 2-1 and Comparative Example 2-1 were evaluated by the following method with respect to the adhesion between the substrate layer 11 and the metal foil layer 14. Initially, the outer packaging material 10 for electric storage device was placed in the forming device so that the sealant layer 17 was arranged to face upward. The forming depth of the molding device was set at 5 mm and cold forming was performed under an environment of room temperature of 23° C. and a dew-point temperature of −35° C. It will be noted that a punch mold used was one that had a cross section of a rectangle with a size of 70 mm×80 mm, a radius of punch (RP) of 1.00 mm at the bottom face thereof and a radius corner of punch (RCP) of 1.00 mm at the side face. The die mold used was one that had a radius of die (RD) of 1.00 mm at the upper face of an opening.

Next, the cold formed outer packaging material 10 was placed in a 100 ml beaker, in which 30 ml of a 1M lithium phosphate hexafluoride (ratios by volumes of solvents=ethyl carbonate:dimethyl carbonate:dimethyl carbonate=1:1:1) was placed. Thereafter, the beaker in which the outer packaging material 10 had been placed was sealed in an 18-liter square can and placed in a temperature environment of 40° C. for 2 hours, thereby exposing the outer packaging material 10 to the electrolytic solution. Subsequently, the outer packaging material 10 was taken out from the 18-liter square can and placed in an environment of a temperature of 60° C. and a humidity of 95% in an oven of 110° C., or in hot water of 50° C. One week, two weeks, three weeks, four weeks and nine weeks after the placement, the presence or absence of peeling between the substrate layer 11 and the metal foil layer 14 of the outer packaging material 10 was visually confirmed to determine a maximum period of time (unit: week), over which no occurrence of peeling between the substrate layer 11 and the metal foil layer 14 was confirmed. Based on the results, the adhesion between the substrate layer 11 and the metal foil layer 14 was evaluated according to the following evaluation standards. The results are shown in Table 5. If evaluated as B or better, the adhesion between the substrate layer 11 and the metal foil layer 14 is found to be good.

A: No peeling was confirmed even after 9 weeks.
B: Although no peeling was confirmed after 4 weeks, peeling occurred after 9 weeks.
C: Although no peeling was confirmed after 3 weeks, peeling occurred after 4 weeks.
D: Although no peeling was confirmed after 2 weeks, peeling occurred after 3 weeks.
E: Although no peeling was confirmed after 1 week, peeling occurred after 2 weeks.
F: Peeling occurred after 1 week

TABLE 5

| | Substrate layer | | | | | | |
|---|---|---|---|---|---|---|---|
| | | 95° C. Hot water shrinkage | 180° C. Hot shrinkage | Metal foil layer | Formed | Adhesion | | |
| | Name of substrate | rate (%) | rate (%) | surface treatment | depth (mm) | 110° C. | 60° C., 95% | Hot water 50° C. |
| Example 2-1 | A-2-1 | 3.5 | 18.7 | Cerium oxide | 4.5 | A | A | A |
| Comparative Example 2-1 | A-2-2 | 2.5 | 6.0 | Cerium oxide | <4.5 | A | A | A |

As will be apparent from the results shown in Table 5 and relating to the outer packaging materials having the substrate layer 11 whose thickness was set at 12 nm, it has been confirmed that the outer packaging material of Example 2-1 making use of the polyester film as the substrate layer 11 having a hot water shrinkage rate at 95° C. of less than 5% and a hot shrinkage rate at 180° C. of 10 to 25% is improved in the deep drawing forming while maintaining the adhesion when compared with the outer packaging material of Comparative Example 2-1 making use of the polyester film wherein its hot shrinkage rate at 180° C. does not satisfy the above requirement.

Example 2-2

In Example 2-2, the following changes to Example 2-1 were made. In Example 2-2, a polyurethane adhesive formulating a polyisocyanate in an acid-modified polyolefin dissolved in a mixed solvent of toluene and methylcyclohexane was coated for the sealant adhesion layer 16. A 40 μm thick polyolefin film (a film corona treated on the surface of an unstretched polypropylene film at the side of the sealant adhesion layer 16) serving as the sealant layer 17 and the metal foil layer 14 were bonded together through the sealant adhesion layer 16 according to a dry lamination process instead of the sandwich lamination process. Thereafter, the structure composed of the substrate layer 11, the adhesion layer 13, the corrosion inhibition treatment layer 15a, the metal foil layer 14, the corrosion inhibition treatment layer 15b, the sealant adhesion layer 16 and the sealant layer 17 were allowed to stand in a temperature atmosphere of 40° C. for 6 days for aging treatment. In Example 2-2, an outer packaging material 10 for electric storage device was fabricated in the same manner as in Example 2-1 except for the above changes.

<Evaluation of Molded Depth>

As to the outer packaging material 10 for electric storage device fabricated in Example 2-2, the formed depth enabling deep drawing forming was evaluated by such a test method as in the above Example 2-1. The results are shown in Table 6.

<Evaluation of Adhesion>

As to the outer packaging material 10 for electric storage device fabricated in Example 2-2, the adhesion between the substrate layer 11 and the metal foil layer 14 was evaluated by such a test method as in the above Example 2-1. The results are shown in Table 6.

TABLE 6

| | Substrate layer | | | | | | |
|---|---|---|---|---|---|---|---|
| | | 95° C. Hot water shrinkage | 180° C. Hot shrinkage | Metal foil layer | Formed | Adhesion | | |
| | Name of substrate | rate (%) | rate (%) | surface treatment | depth (mm) | 110° C. | 60° C., 95% | Hot water 50° C. |
| Example 2-2 | A-2-1 | 3.5 | 18.7 | Cerium oxide | 6.0 | A | A | A |

As will be apparent from the results shown in Table 6 and relating to the outer packaging material wherein the thickness of the substrate layer 11 was set at 12 μm, it has been confirmed that the outer packaging material of Example 2-2 making use of the polyester film as the substrate layer 11 having a high water shrinkage rate at 95° C. of less than 5% and a hot shrinkage rate at 180° C. of 10 to 25% is improved in deep drawing forming while keeping the adhesion even though the sealant adhesion layer 16 is provided by the dry lamination process.

Example 2-3

In Example 2-3, an outer packaging material 10 for electric storage device was fabricated in the same manner as in Example 2-1 except that a treating solution composed of a phenolic resin, a chromium fluoride compound and phosphoric acid was coated onto both surfaces of the metal foil layer 14 instead of forming the corrosion inhibition treatment layers 15a and 15b using the sodium polyphosphate-stabilized cerium oxide sol, thereby forming films and was subjected to chromate treatment by baking to form corrosion inhibition treatment layers 15a and 15b and that the substrate layer 11 was change to polyethylene terephthalate film B-2-1.

Example 2-4

In Example 2-4, an outer packaging material 10 for electric storage device was fabricated in the same manner as in Example 2-1 except that the substrate layer 11 was changed to polyethylene terephthalate film B-2-2.

Example 2-5

In Example 2-5, an outer packaging material 10 for electric storage device was fabricated in the same manner as in Example 2-1 except that the substrate layer 11 was changed to polyethylene terephthalate film B-2-3.

Example 2-6

In Example 2-6, an outer packaging material 10 for electric storage device was fabricated in the same manner as in Example 2-1 except that the substrate layer 11 was changed to polyethylene terephthalate film B-2-4.

Comparative Example 2-2

In Comparative Example 2-2, an outer packaging material 10 for electric storage device was fabricated in the same manner as in Example 2-1 except that the substrate layer 11 was changed to polyethylene terephthalate film B-2-5.

Comparative Example 2-3

In Comparative Example 2-3, an outer packaging material 10 for electric storage device was fabricated in the same manner as in Example 2-1 except that the substrate layer 11 was changed to polyethylene terephthalate film B-2-6.\

Comparative Example 2-4

In Comparative Example 2-4, an outer packaging material 10 for electric storage device was fabricated in the same manner as in Example 2-1 except that the substrate layer 11 was changed to polyethylene terephthalate film B-2-7.

<Evaluation of Formed Depth>

As to the outer packaging material 10 for electric storage device fabricated in Examples 2-3 to 2-6 and Comparative Examples 2-2 to 2-4, the formed depth enabling deep drawing forming was evaluated by such a test method as in the above Example 2-1. The results are shown in Table 7.

<Evaluation of Adhesion>

As to the outer packaging material 10 for electric storage device fabricated in Examples 2-3 to 2-6 and Comparative Examples 2-2 to 2-4, the adhesion between the substrate layer 11 and the metal foil layer 14 was evaluated by such a test method as in the above Example 2-1. The results are shown in Table 7.

As will be apparent from the results shown in Table 7 and relating to the outer packaging materials having the substrate layer 11 whose thickness is set at 25 μm, it has been confirmed that the outer packaging materials of Examples 2-3 to 2-6 making use, as the substrate layer 11, of the polyester films having hot water shrinkage rates at 95° C. of less than 5% and hot shrinkage rates at 180° C. of 10 to 25% can be improved in the deep drawing molding while maintaining the adhesion when compared with the outer packaging materials of Comparative Examples 2-2 to 2-4 making use of the polyester films that do not satisfy at least one of the above requirements of the hot water shrinkage rates at 95° C. and the hot shrinkage rates at 180° C.

Example 2-7

In Example 2-7, an outer packaging material 10 for electric storage device was fabricated in the same manner as in Example 2-1 except that an easy adhesion treatment layer 12 was formed on a surface of the substrate layer 11 at the side of the adhesion layer 13 instead of corona treatment on one surface of the substrate layer 11 and the substrate layer 11 was changed to polyethylene terephthalate film C-2-1. The easy adhesion treatment layer 12 was formed by coating a coating agent serving as a matrix material of the easy adhesion treatment layer 12 on one surface of the substrate layer 11 at a solid content of 0.1 g/m² by an inline coating method and dried thereby obtaining an about 0.1 μm thick easy adhesion treatment layer 12.

Comparative Example 2-5

In Comparative Example 2-5, an outer packaging material 10 for electric storage device was fabricated in the same manner as in Example 2-7 except that the substrate layer 11 was changed to polyethylene terephthalate film C-2-2.

<Evaluation of Formed Depth>

As to the outer packaging materials 10 for electric storage device fabricated in Example 2-7 and Comparative Example 2-5, the formed depth enabling deep drawing forming was evaluated by such a test method as in the above Example 2-1. The results are shown in Table 8.

<Evaluation of Adhesion>

As to the outer packaging materials 10 for electric storage device fabricated in Example 2-7 and Comparative Example 2-5, the adhesion between the substrate layer 11 and the metal foil layer 14 was evaluated by such a test method as in the above Example 2-1. The results are shown in Table 8.

TABLE 7

| | Substrate layer | | | | | Adhesion | | |
|---|---|---|---|---|---|---|---|---|
| | Name of substrate | 95° C. Hot water shrinkage rate (%) | 180° C. Hot shrinkage rate (%) | Metal foil layer surface treatment | Formed depth (mm) | 110° C. | 60° C., 95% | Hot water 50° C. |
| Example 2-3 | B-2-1 | 2.8 | 19.9 | Chromate | 6.0 | B | A | A |
| Example 2-4 | B-2-2 | 2.8 | 19.9 | Cerium oxide | 6.0 | A | A | A |
| Example 2-5 | B-2-3 | 3.3 | 23.8 | Cerium oxide | 6.0 | A | A | A |
| Example 2-6 | B-2-4 | 2.4 | 11.2 | Cerium oxide | 6.0 | A | A | A |
| Comparative Example 2-2 | B-2-5 | 2.6 | 5.7 | Cerium oxide | 4.5 | A | A | A |
| Comparative Example 2-3 | B-2-6 | 8.5 | 19.0 | Cerium oxide | 6.0 | F | A | A |
| Comparative Example 2-4 | B-2-7 | 6.0 | 28.8 | Cerium oxide | 6.0 | D | A | A |

TABLE 8

| | Substrate layer | | | | | | |
|---|---|---|---|---|---|---|---|
| | | 95° C. Hot water shrinkage | 180° C. Hot shrinkage | Metal foil layer | Formed | Adhesion | | |
| | Name of substrate | rate (%) | rate (%) | surface treatment | depth (mm) | 110° C. | 60° C., 95% | Hot water 50° C. |
| Example 2-7 | C-2-1 | 2.6 | 18.4 | Cerium oxide | 7.5 | A | A | A |
| Comparative Example 2-5 | C-2-2 | 3.1 | 6.6 | Cerium oxide | 5.0 | A | A | A |

As will be apparent from the results shown in Table 8 and relating to the outer packaging materials wherein the thickness of the substrate layer 11 is set at 25 μm and the easy adhesion treatment layer 12 is provided, it has been confirmed that the outer packaging material of Example 2-7 making use, as the substrate layer 11, of the polyester films having a hot water shrinkage rate at 95° C. of less than 5% and a hot shrinkage rate at 180° C. of 10 to 25% can be improved in the deep drawing molding while maintaining the adhesion when compared with the outer packaging material of Comparative Example 2-5 making use of the polyester film that does not satisfy the above requirement of the hot shrinkage rate at 180° C.

REFERENCE SIGNS LIST

1 . . . battery element, 2 . . . lead, 10 . . . outer packaging material (outer packaging material for electric storage device), 11 . . . substrate layer, 12 . . . easy adhesion treatment layer, 13 . . . adhesion layer, 14 . . . metal foil layer, 15a, 15b . . . corrosion treatment layers, 16 . . . sealant adhesion layer, 17 . . . sealant layer, 30 . . . embossed outer packaging material, 32 . . . formed area (recess), 34 . . . cover, 40 . . . secondary battery

What is claimed is:

1. An outer packaging material for electric storage device having a structure comprising:
   at least a substrate layer, an adhesion layer, a metal foil layer, a sealant adhesion layer, and a sealant layer laminated in this order,
   wherein the substrate layer is one made of (a) a polyamide film having a hot water shrinkage rate at 95° C. of less than 5% and a hot shrinkage rate at 180° C. of 4% to 16%, or (b) a polyester film having a hot water shrinkage rate at 95° C. of less than 5% and a hot shrinkage rate at 180° C. of 10% to 25%, wherein the outer packaging material further comprises an adhesion treatment layer between the substrate layer and the adhesion layer, the adhesion treatment layer is in direct physical contact with each of the substrate layer and the adhesion layer.

2. The outer packaging material for electric storage device of claim 1, wherein the adhesion treatment layer is one containing at least one resin selected from the group consisting of a polyester resin, an acrylic resin, a polyurethane resin, an epoxy resin, and an acrylic-grafted polyester resin or combinations thereof.

3. The outer packaging material for electric storage device of claim 1, further comprising a corrosion inhibition treatment layer provided on both surfaces of the metal foil layer.

4. The outer packaging material for electric storage device of claim 3, wherein the corrosion inhibition treatment layer contains a rare earth element oxide and phosphoric acid or a phosphate salt.

5. The outer packaging material for electric storage device of claim 4, wherein the rare earth element oxide consists of cerium oxide.

6. The outer packaging material for electric storage device of claim 1, wherein the substrate layer is a polyester film having a hot water shrinkage rate at 95° C. of less than 5% and a hot shrinkage rate at 180° C. of 10% to 25%.

7. The outer packaging material for electric storage device of claim 1, wherein the substrate layer is a polyester film having a hot water shrinkage rate at 95° C. of less than 4% and a hot shrinkage rate at 180° C. of 10% to 25%.

8. The outer packaging material for electric storage device of claim 7, wherein a thickness of the substrate layer is from 10 μm to 30 μm.

9. The outer packaging material for electric storage device of claim 8, further comprising a corrosion inhibition treatment layer on both surfaces of the metal foil layer, the corrosion inhibition layer contains a rare earth element oxide and phosphoric acid or a phosphate salt.

10. The outer packaging material for electric storage device of claim 9, wherein the rare earth element oxide consists of cerium oxide.

11. The outer packaging material for electric storage device of claim 1, wherein the substrate layer is made of a polyamide film having a hot water shrinkage rate at 95° C. of less than 5% and a hot shrinkage rate at 180° C. of 4% to 16%.

12. The outer packaging material for electric storage device of claim 1, wherein the substrate layer is made of a polyamide film having a hot water shrinkage rate at 95° C. from about 2.8% and no larger than 4% and a hot shrinkage rate at 180° C. of 4% to 16%.

13. The outer packaging material for electric storage device of claim 1, wherein the substrate layer is made of a polyamide film having a hot water shrinkage rate at 95° C. from about 3.6% and no larger than 4% and a hot shrinkage rate at 180° C. of 4% to 16%.

14. The outer packaging material for electric storage device of claim 13, wherein the substrate layer has a thickness from 10 μm to 30 μm.

15. The outer packaging material for electric storage device of claim 14, further comprising a corrosion inhibition treatment layer on both surfaces of the metal foil layer, the corrosion inhibition layer contains a rare earth element oxide and phosphoric acid or a phosphate salt.

16. The outer packaging material for electric storage device of claim 15, wherein the rare earth element oxide consists of cerium oxide.

17. An electric storage device comprising a battery element including electrodes, leads extending from the respective electrodes and a container accommodating the battery element, wherein the container is formed from the outer packaging material for electric storage device defined in claim 1 so that the sealant layer is arranged at the inner side thereof.

18. An electric storage device comprising a battery element including electrodes, leads extending from the respective electrodes and a container accommodating the battery element, wherein the container comprises at least a substrate layer, an adhesion layer, a metal foil layer, a sealant adhesion layer, and a sealant layer laminated in this order, wherein the substrate layer is one made of (a) a polyamide film having a hot water shrinkage rate at 95° C. of less than 5% and a hot shrinkage rate at 180° C. of 4% to 16%, or (b) a polyester film having a hot water shrinkage rate at 95° C. of less than 5% and a hot shrinkage rate at 180° C. of 10% to 25%, and wherein the sealant layer of the container is the innermost layer of the container, which faces the battery.

19. The electric storage device of claim 18, wherein the substrate layer is made of a polyamide film having a hot water shrinkage rate at 95° C. of less than 5% and a hot shrinkage rate at 180° C. of 4% to 16%.

20. The electric storage device of claim 18, wherein the substrate layer is a polyester film having a hot water shrinkage rate at 95° C. of less than 5% and a hot shrinkage rate at 180° C. of 10% to 25%.

\* \* \* \* \*